(12) United States Patent
Au et al.

(10) Patent No.: US 8,218,633 B2
(45) Date of Patent: Jul. 10, 2012

(54) BIDIRECTIONALLY DECODABLE WYNER-ZIV VIDEO CODING

(75) Inventors: Oscar Chi Lim Au, Hong Kong (CN); Xiaopeng Fan, Hong Kong (CN)

(73) Assignee: Kiu Sha Management Limited Liability Company, Wilmington, DE (US)

( * ) Notice: Subject to any disclaimer, the term of this patent is extended or adjusted under 35 U.S.C. 154(b) by 1057 days.

(21) Appl. No.: 12/141,152

(22) Filed: Jun. 18, 2008

(65) Prior Publication Data

US 2009/0316783 A1 Dec. 24, 2009

(51) Int. Cl.
*H04B 1/66* (2006.01)
(52) U.S. Cl. .................................. 375/240.15
(58) Field of Classification Search ............... 375/240.1, 375/240.15, 240.09, 240.03; 382/233, 236
See application file for complete search history.

(56) References Cited

U.S. PATENT DOCUMENTS

| | | | |
|---|---|---|---|
| 6,307,886 B1* | 10/2001 | Westermann | 375/240.09 |
| 6,483,875 B1* | 11/2002 | Hasebe et al. | 375/240.15 |
| 6,771,825 B1* | 8/2004 | Hurst, Jr. | 382/236 |
| 7,295,612 B2* | 11/2007 | Haskell et al. | 375/240.15 |
| 2002/0101915 A1* | 8/2002 | Zhang et al. | 375/222 |
| 2004/0240742 A1* | 12/2004 | Takahashi et al. | 382/232 |
| 2007/0253479 A1* | 11/2007 | Mukherjee | 375/240.1 |
| 2008/0247462 A1* | 10/2008 | Demos | 375/240.03 |
| 2009/0041123 A1* | 2/2009 | Haskell et al. | 375/240.15 |
| 2009/0175332 A1* | 7/2009 | Karczewicz et al. | 375/240.03 |
| 2009/0257668 A1* | 10/2009 | Ye et al. | 382/233 |

OTHER PUBLICATIONS

Schwarz et al, An improved H.26L using Lagrangian Coder Control, 2001.*
Sullivan et al, Rate-distortion optimization for video compression, Nov. 1998.*
S. Wenger, "Error patterns for internet experiments," in ITU-T SG16 Doc. Q15-I-16rl, Oct. 1999.

* cited by examiner

*Primary Examiner* — Andrew Chriss
*Assistant Examiner* — Vincelas Louis
(74) *Attorney, Agent, or Firm* — Turocy & Watson, LLP

(57) ABSTRACT

Systems and methodologies for employing bidirectionally decodable Wyner-Ziv video coding (BDWZVC) are described herein. BDWZVC can be used to generate M-frames, which have multiple reference frames at an encoder and can be forward and backward decodable. For example, optimal Lagrangian multipliers for forward and backward motion estimation can be derived and/or utilized. The optimal Lagrangian multiplier for backward motion estimation can be approximately twice as large as the optimal Lagrangian multiplier for forward motion estimation. Further, an optimal P-frame/M-frame selection scheme can be employed to enhance rate-distortion performance when video is transmitted over an error prone channel. Accordingly, a first frame in a group of pictures (GOP) can be encoded as an I-frame, a next m−1 frames can be encoded as P-frames, and a remaining n−m frames can be encoded as M-frames, where n can be a length of the GOP and m can be optimally identified.

20 Claims, 16 Drawing Sheets

| Bitrate | loss rate p=0 | | p=0.03 | | p=0.05 | | p=0.1 | |
|---|---|---|---|---|---|---|---|---|
| | m | gain (dB) | m | gain | m | gain | m | gain |
| 51.2 b/s | 11 | 1.80 | 7 | 0.55 | 5 | 0.21 | 4 | 0.11 |
| 139 b/s | 11 | 1.55 | 4 | 0.28 | 3 | 0.16 | 3 | 0.10 |
| 324 b/s | 11 | 1.17 | 3 | 0.07 | 2 | 0.04 | 2 | 0.02 |

FIG. 14

BIDIRECTIONALLY DECODABLE WYNER-ZIV VIDEO CODING

TECHNICAL FIELD

The present disclosure relates generally to video transmission, and more particularly to utilizing bidirectionally decodable Wyner-Ziv coding in a video transmission system.

BACKGROUND

Recent technological advances have led to video transmission becoming a more prevalently utilized form of communication. For instance, video data can be captured, encoded, and transferred over a transmission channel. Further, the video data can be received via the transmission channel, decoded, and outputted (e.g., rendered, displayed, . . . ). Various video coding techniques can be used to provide video compression, error resilience (ER), and so forth. For instance, video compression techniques can be used to reduce the quantity of data utilized to represent video images; thus, compressed video can reduce bandwidth used for transfer of digital video over the transmission channel. Interframe compression, for example, is a type of video compression that can use one or more earlier or later frames in a sequence of frames to compress a current frame. Moreover, error resilience (ER) techniques are oftentimes used with video transmissions to mitigate errors that can occur when video is transferred via a transmission channel.

Video streaming services over a communication network have received tremendous attention from both academia and industry. For fast and user friendly browsing, it is desirable that video streaming systems be able to provide effective video cassette recording (VCR) functionalities such as forward, backward, pause, and random access. However, traditional hybrid video coding schemes typically complicate reverse-play operations. Under a simple 'IPPP . . . ' group of picture (GOP) structure, a last P-frame in a sequence that forms the GOP typically can only be decoded after all other frames in the GOP are transmitted and decoded. This can require a significant storage buffer in the decoder to store the decoded frames in the GOP. Alternatively, if a storage buffer is not used to store the decoded frames in the GOP for reverse playback, previous frames (e.g., frames earlier in the sequence of the GOP structure organized in temporal order) need to be transmitted and decoded over and over, thus wasting resources such as processor cycles, bandwidth, and the like.

To reduce costs of storage and bandwidth of reverse playback, various schemes have been proposed including online transcoding schemes and dual-bitstream schemes, for instance. However, such conventional techniques commonly fail to achieve reversibility with both low extra storage and low extra bandwidth simultaneously.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

Systems and methodologies for employing bidirectionally decodable Wyner-Ziv video coding (BDWZVC) are described herein. BDWZVC can be used to generate M-frames, which have multiple reference frames at an encoder and can be forward and backward decodable. For example, optimal Lagrangian multipliers for forward and backward motion estimation can be derived and/or utilized. Following this example, the optimal Lagrangian multiplier for backward motion estimation can be approximately twice as large as the optimal Lagrangian multiplier for forward motion estimation. Further, an optimal P-frame/M-frame selection scheme can be employed to enhance rate-distortion performance when video is transmitted over an error prone channel. Accordingly, a first frame in a group of pictures (GOP) can be encoded as an I-frame, a next m−1 frames can be encoded as P-frames, and a remaining n−m frames can be encoded as M-frames, where n can be a length of the GOP and m can be optimally identified.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed. The claimed subject matter is intended to include all such aspects and their equivalents. Other advantages and novel features of the claimed subject matter can become apparent from the following detailed description when considered in conjunction with the drawings.

BRIEF DESCRIPTION OF THE DRAWINGS

Various non-limiting embodiments are further described with reference to the accompanying drawings in which:

FIGS. 10-14 illustrate various simulations depicting performance of various video coding schemes under different conditions according to various embodiments;

DETAILED DESCRIPTION

Figure 1:
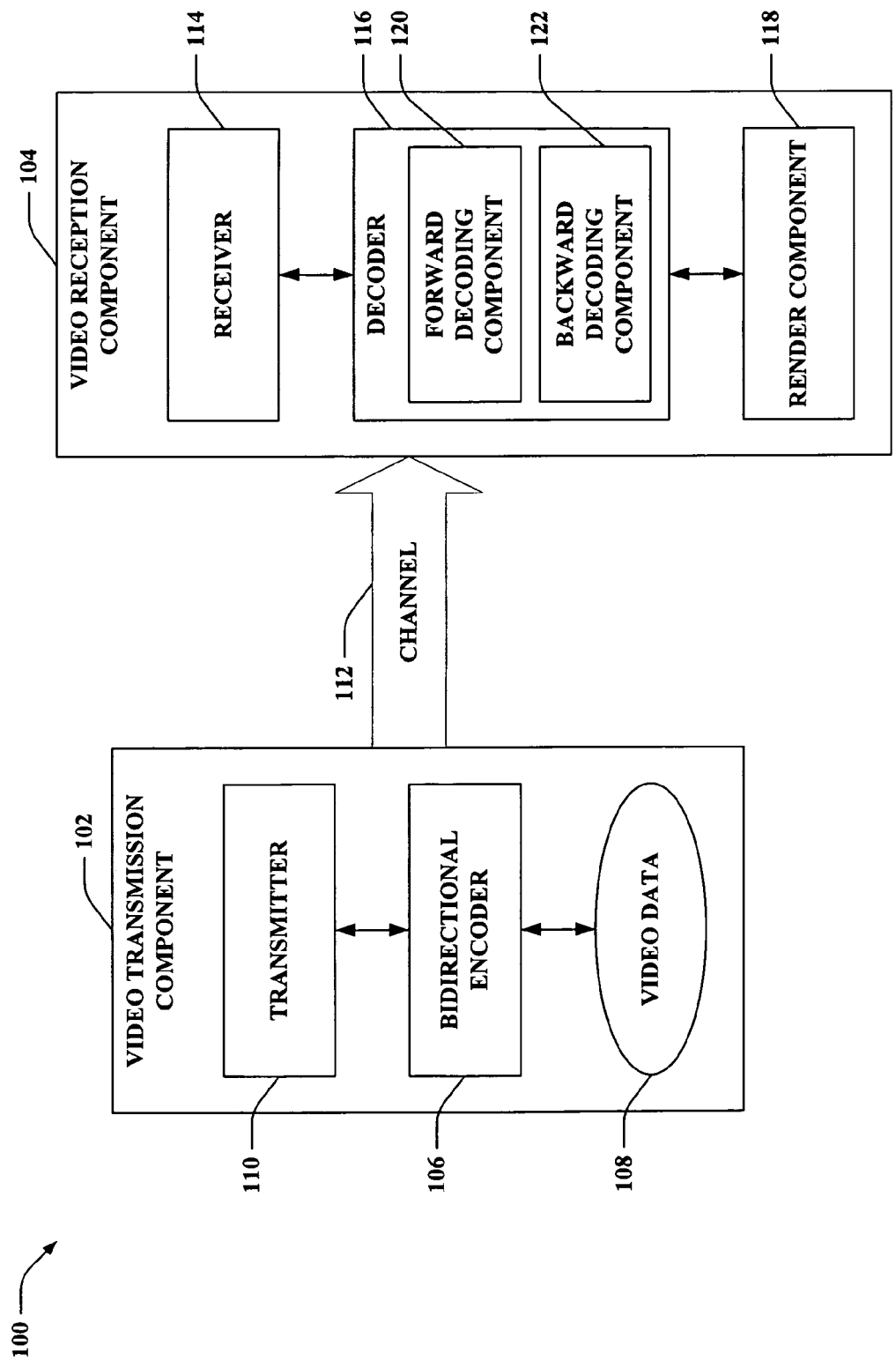
FIG. 1 is an illustration of an example system that enhances reverse playback and error resilience by leveraging bidirectionally decodable Wyner-Ziv video coding for video transmission.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, the methods and apparatus of the claimed subject matter, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the claimed subject matter. The components may communicate via local and/or remote processes such as in accordance with a signal having one or more data packets (e.g., data from one component interacting with another component in a local system, distributed system, and/or across a network such as the Internet with other systems via the signal).

Reverse playback is a common video cassette recording (VCR) function for video streaming systems. However, predictive processing techniques commonly employed in traditional hybrid video coding schemes oftentimes complicate reverse-play operation. In contrast, various embodiments described herein enhance a bidirectionally decodable Wyner-Ziv video coding scheme which supports both forward decoding and backward decoding. For example, optimal Lagrangian multipliers for forward and backward motion estimation can be utilized in connection with the bidirectionally decodable Wyner-Ziv video coding scheme, where the optimal Lagrangian multiplier for backward motion estimation can be averagely two times larger than the optimal Lagrangian multiplier for forward motion estimation. Following this example, such backward motion estimation related multiplier can contribute 0.2 dB gain in average. Further, an optimal P-frame/M-frame selection scheme to improve rate-distortion performance when video is transmitted over error prone channels is described herein. Such selection scheme can outperform conventional schemes such as H.264 at various loss rates.

Now referring to FIG. 1, illustrated is a system 100 that enhances reverse playback and error resilience by leveraging bidirectionally decodable Wyner-Ziv video coding for video transmission. The system 100 includes a video transmission component 102 and a video reception component 104 that can communicate any type of data related to video there between by way of any type of connection. Additionally, it is to be appreciated that any disparate type of data can be communicated between the video transmission component 102 and the video reception component 104. The video transmission component 102 can be a computing device (e.g., personal computer, a laptop, a handheld computing device, . . . ), a telephone (e.g., a cellular phone, a smart phone, a wireless phone, . . . ), a handheld communication device, a gaming device, a personal digital assistant (PDA), a teleconferencing system, a consumer product, an automobile, a mobile media player (e.g., MP3 player, . . . ), a camera (e.g., still image camera and/or video camera, . . . ), a server, a network node, or the like. Further, the video reception component 104 can be a computing device (e.g., personal computer, a laptop, a handheld computing device, . . . ), a telephone (e.g., a cellular phone, a smart phone, a wireless phone, . . . ), a handheld communication device, a gaming device, a personal digital assistant (PDA), a teleconferencing system, a consumer product, an automobile, a mobile media player (e.g., MP3 player, . . . ), a camera (e.g., still image camera and/or video camera, . . . ), a server, a network node, or the like. Although one video transmission component 102 and one video reception component 104 are depicted, it is to be appreciated that the system 100 can include any number of video transmission components similar to the video transmission component 102 and/or any number of video reception components similar to the video reception component 104. Moreover, according to an example, it is contemplated that the video transmission component 102 and the video reception component 104 can be substantially similar to each other; thus, at a disparate time (not shown), the video transmission component 102 can switch to be a video reception component and the video reception component 104 can switch to be a video transmission component. However, the claimed subject matter is not limited to the aforementioned example.

It is to be appreciated that the system 100 can employ any type of network architecture. Thus, for example, the video transmission component 102 and the video reception component 104 can transfer data there between employing a peer-to-peer architecture (e.g., the video transmission component 102 and the video reception component 104 can directly communicate with one another over a network connection, . . . ). Additionally or alternatively, data transmitted between the video transmission component 102 and the video reception component 104 can traverse through a network that includes disparate component(s) (not shown) (e.g., router(s), switch(es), gateway(s), node(s), . . . ). Further, packets including video data can traverse between the video transmission component 102 and the video reception component 104 by way of any wired and/or wireless medium(s).

The video transmission component 102 can further include a bidirectional encoder 106 that encodes video data 108 and a transmitter 110 that transmits the encoded video data yielded from the bidirectional encoder 106. For example, the video data 108 can be captured using a video camera (not shown). According to another illustration, the video data 108 can be retrieved from memory (not shown); the memory can be associated with the video transmission component 102 and/or can be external to the video transmission component 102.

The bidirectional encoder 106 can encode the video data 108 for transmission. For instance, the bidirectional encoder 106 can use Wyner-Ziv video coding (WZVC) to yield video frames for transfer over a channel 112 including I-frames, P-frames, M-frames, and so forth. An M-frame is essentially a P-frame with multiple decoder selectable reference frames. Different from the traditional P-frame or Wyner-Ziv frame, the M-frame has multiple reference frames at the video transmission component 102 (e.g., at the bidirectional encoder 106, . . . ) but can be decoded even if only one of the reference frames is available at the video reception component 104 (e.g., at a decoder, . . . ). The encoded frames yielded by the bidirectional encoder 106 can sent to the video reception component 104 via the channel 112 by the transmitter 110.

Although one encoder (e.g., the bidirectional encoder 106) is illustrated in FIG. 1, according to another example it is to be appreciated that separate encoders can be utilized to yield different frame types. Following this example (not shown), the bidirectional encoder 106 can yield M-frames while a second encoder (e.g., H.264 encoder, . . . ) can generate I-frames. Further, in case of a hybrid scheme as described herein, a third encoder can be used to yield P-frames. However, it is to be appreciated that an encoder can yield more than one frame type (e.g., the bidirectional encoder 106 can yield I-frames, P-frames, and M-frames, the bidirectional encoder 106 can yield M-frames while the second encoder can yield I-frames and P-frames, the bidirectional encoder 106 can yield M-frames and one of I-frames and P-frames while the second encoder can yield the other frame type not yielded by the bidirectional encoder 106, . . . ).

The video reception component 104 can receive the encoded frames transferred over the channel 112. Moreover, the video reception component 104 can include a receiver 114, a decoder 116, and a render component 118. The receiver 114 can receive signals including the encoded frames communicated over the channel 112 and perform operations such as filtering, amplifying, demodulating, etc. upon the received signals. Further, the receiver 114 can provide an output to the decoder 116, which decodes the frames included in the received signals to yield the video frames. The decoder 116 can include a forward decoding component 120 and a backward decoding component 122. The forward decoding component 120 can decode the video frames in temporal order, while the reverse decoding component 122 can decode the video frames in reverse temporal order. Moreover, the render component 118 can generate an output based upon the video frames outputted by the decoder 116. For example, the render component 118 can be a display upon which the video frames can be presented. According to another illustration, the render component 118 can enable storing the video frames obtained from the decoder 116 in memory (e.g., associated with the video reception component 104, external memory accessible by the video reception component 104, . . . ) (not shown); thus, the stored video frames retained in memory can be retrieved at a later time (e.g., by the render component 118, . . . ) and thereafter outputted (e.g., displayed, encoded and transferred to a disparate component (not shown), . . . ).

According to an illustration, the bidirectional encoder 106 employs a bidirectionally decodable Wyner-Ziv video coding scheme (BDWZVC) which supports both forward decoding and backward decoding (e.g., respectively by the forward decoding component 120 and the reverse decoding component 122, . . . ). Different from existing schemes, use of the bidirectionally decodable Wyner-Ziv video coding scheme can enable achieving reversibility with both low extra storage and low extra bandwidth. Thus, in a group of pictures structure, each M-frame can be decoded by using a corresponding previous frame as reference (e.g., using the forward decoding component 120, . . . ) or a corresponding subsequent frame as reference (e.g., using the backward decoding component 120, . . . ). Further, the bidirectionally decodable Wyner-Ziv video coding scheme can be inherently error resilient when video is transmitted over error-prone channels (e.g., the channel 112, . . . ), since the decoder 116 has flexibility of choosing a forward predicted frame or backward predicted frame as reference.

Pursuant to another example, the bidirectional encoder 106 can determine and/or utilize optimal Lagrangian multipliers for forward motion estimation and backward motion estimation as described herein. In accordance with a further example, the bidirectional encoder 106 can employ a P-frame/M-frame selection scheme to optimize rate-distortion (R-D) performance for different frame loss rates as set forth herein. It is to be appreciated, however, that the claimed subject matter is not limited to the foregoing examples.

Figure 2:
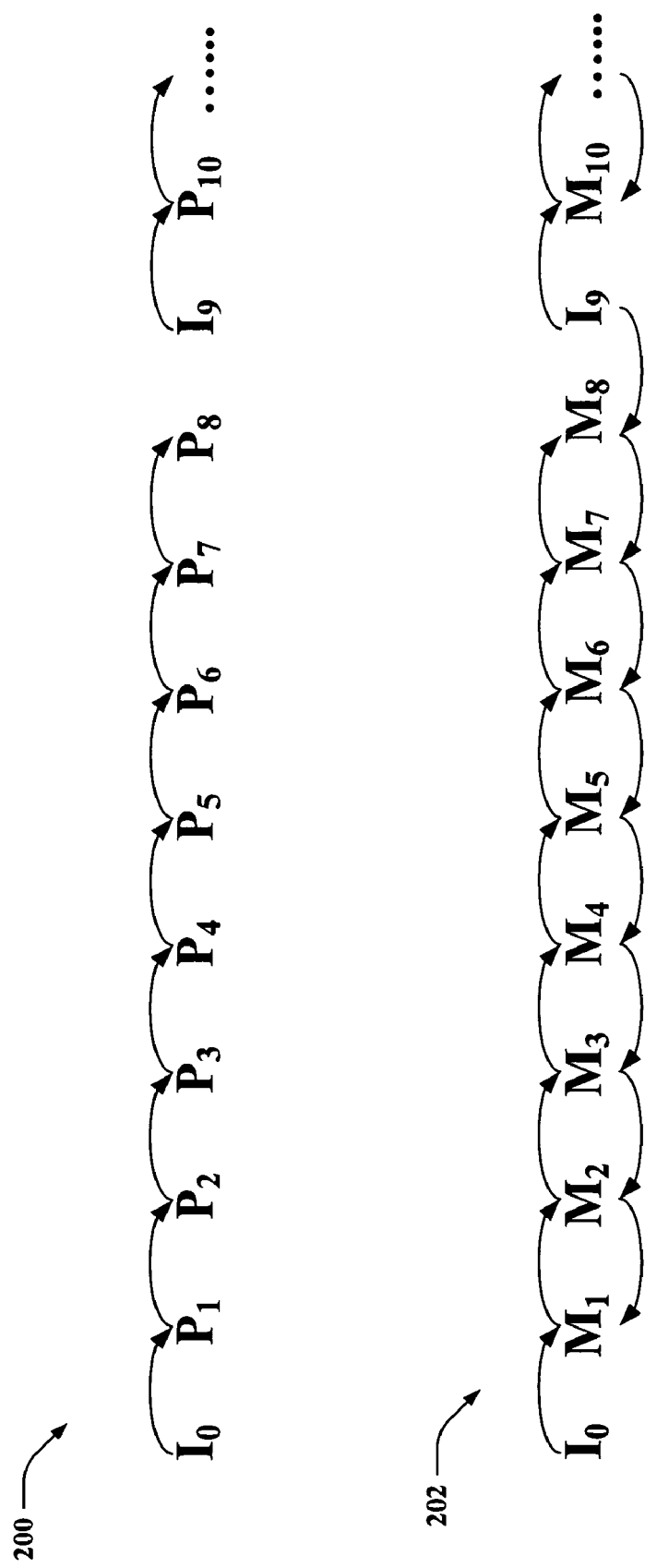
FIGS. 2-3 illustrate example video coding patterns that can be utilized in accordance with various aspects of the claimed subject matter.
Figure 3:
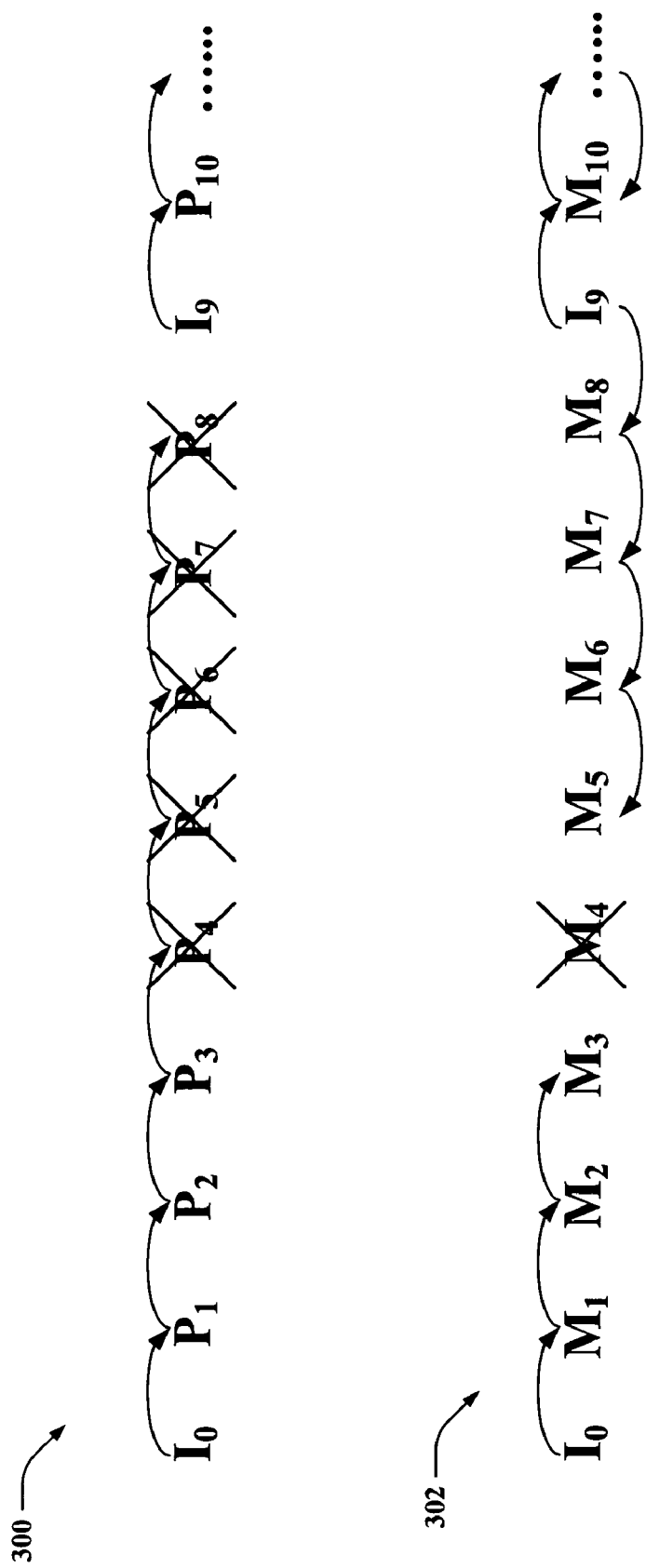

Referring to FIGS. 2-3, illustrated are example video coding patterns that can be utilized in accordance with various aspects of the claimed subject matter. Various types of frames can be supported for video encoding. Moreover, arrows depicted in FIGS. 2-3 represent the dependency of each of the frames where an earlier frame and/or a later frame is/are used as reference(s) for a given frame. For example, a frame can be an intra frame (I-frame), a prediction frame (P-frame), or a multiple decoder selectable reference frame (M-frame). As depicted, a first frame in a group (e.g., group of picture (GOP), . . . ) can be an I-frame. Thereafter, substantially any number of P-frames and/or M-frames (and/or any disparate type of frames) can be included in the group between adjacent I-frames. Another I-frame can then follow, which begins a next group (e.g., a next GOP, . . . ); this next I-frame can be followed by additional P-frames, M-frames, etc. in the next GOP. Moreover, this pattern can be repeated. Although FIGS. 2-3 show a group as including one I-frame and eight subsequent frames (e.g., eight P-frames, eight M-frames, . . . ), it is to be appreciated that the claimed subject matter is not so limited. Rather, any number of P-frames and/or M-frames can be included between adjacent I-frames in a sequence of frames. According to a further illustration, P-frames and M-frames can both be included between adjacent I-frames in the sequence.

I-frames are independent frames that do not depend upon any other frames. I-frames are encoded statically, have a significant amount of the details and content (e.g., in comparison to the P-frames or the M-frames), and are typically larger in size. A P-frame includes encoded difference information (e.g., delta) based upon a comparison with a previous I-frame or P-frame, whichever is closer. Moreover, M-frames can be similar to P-frames, but can include encoded difference information based upon comparisons with both a previous frame and a subsequent frame. For instance, the previous frame can be an I-frame, M-frame, or P-frame, whichever is closest. Similarly, the subsequent frame can be an I-frame, M-frame, or P-frame, whichever is closest.

Further, each frame (e.g., I-frame, P-frame, M-frame, . . . ) can include 1 to X packets, where X can be substantially any integer. Further, the number of packets can be a function of the size of the frame (e.g., which can be based upon the contents of the video). Loss of any packet can cause an entire frame to be dropped (e.g., corrupted, . . . ).

Turning to FIG. 2, illustrated are example video coding patterns. Sequence 200 depicts a conventional video coding pattern and sequence 202 depicts a video coding pattern based upon bidirectionally decodable Wyner-Ziv video coding. As shown in sequences 200 and 202, a first frame in a group of pictures can be an I-frame (e.g., $I_0$, . . . ). Although sequences 200 and 202 illustrate group of pictures that include an I-frame followed by eight frames of a particular type, the claimed subject matter is not so limited as it is contemplated that any number of frames can be included in a group of pictures and/or a mixture of frame types (e.g., M-frames and P-frames, . . . ) can be included in a given group of pictures.

In the conventional sequence 200, the I-frame can be followed by eight P-frames (e.g., $P_1$-$P_8$, . . . ), and thereafter, a next group of pictures can begin with another I-frame (e.g., $I_9$, . . . ), which can be followed by P-frames (e.g., $P_{10}$, . . . ). Arrows depict dependencies between frames; hence, $P_8$ references $P_7$, $P_7$ references $P_6$, $P_6$ references $P_5$, and so forth. In the conventional sequence 200, a P-frame refers back to a previous frame, which can be another P-frame or an I-frame. However, no reference for a P-frame is made to a subsequent frame in the conventional sequence 200 (e.g., $P_5$ does not reference $P_6$, . . . ). Thus, to decode a particular P-frame in the sequence 200, the frame immediately prior to the particular P-frame (e.g., in temporal order, . . . ) needs to be decoded and referenced.

In contrast, the sequence 202 includes eight M-frames (e.g., $M_1$-$M_8$, . . . ) after the I-frame (e.g., $I_0$, . . . ) to form a group of pictures. Further, a next group of pictures can begin with another I-frame (e.g., $I_9$, . . . ), which can be followed by M-frames (e.g., $M_{10}$, . . . ). Each M-frame references its immediately previous and immediately subsequent frame in the sequence 202. Thus, for example, $M_3$ references both $M_2$ and $M_4$. According to an illustration, to decode a particular M-frame in the sequence 202, the frame immediately prior to the particular M-frame and/or the frame immediately subsequent to the particular M-frame can be decoded and referenced.

With reference to FIG. 3, illustrated are example video coding patterns that depict error resilience. Sequence 300 depicts a conventional video coding pattern similar to the sequence 200 of FIG. 2 and sequence 302 depicts a video coding pattern based upon bidirectionally decodable Wyner-Ziv video coding, which can be similar to the sequence 202 of FIG. 2. In both sequences 300 and 302, frame 4 (e.g., $P_4$ in sequence 300, $M_4$ in sequence 302, . . . ) can be lost, corrupted, etc., for example. Per the example in sequence 300, a decoder can be unable to decode the P-frames following frame 4 in the group of pictures (e.g., the decoder can be unable to decode frames $P_5$-$P_8$, . . . ). Thus, a lost, corrupted, etc. frame can cause an error to propagate until a following I-frame (e.g., $I_9$, . . . ) in the conventional sequence 300.

On the contrary, the sequence 302 can provide error resilience when video is transmitted over error-prone channels, since the decoder has flexibility of choosing a forward predicted frame or a backward predicted frame as reference. Thus, if frame 4 (e.g., $M_4$, . . . ) is lost, corrupted, etc., frames following frame 4 in the group of pictures (e.g., frames $M_5$-$M_8$, . . . ) can still be decoded in reverse temporal order from a following I-frame (e.g., $I_9$, . . . ). Accordingly, error propagation within the group of pictures can be mitigated using bidirectionally decodable Wyner-Ziv video coding.

Figure 4:
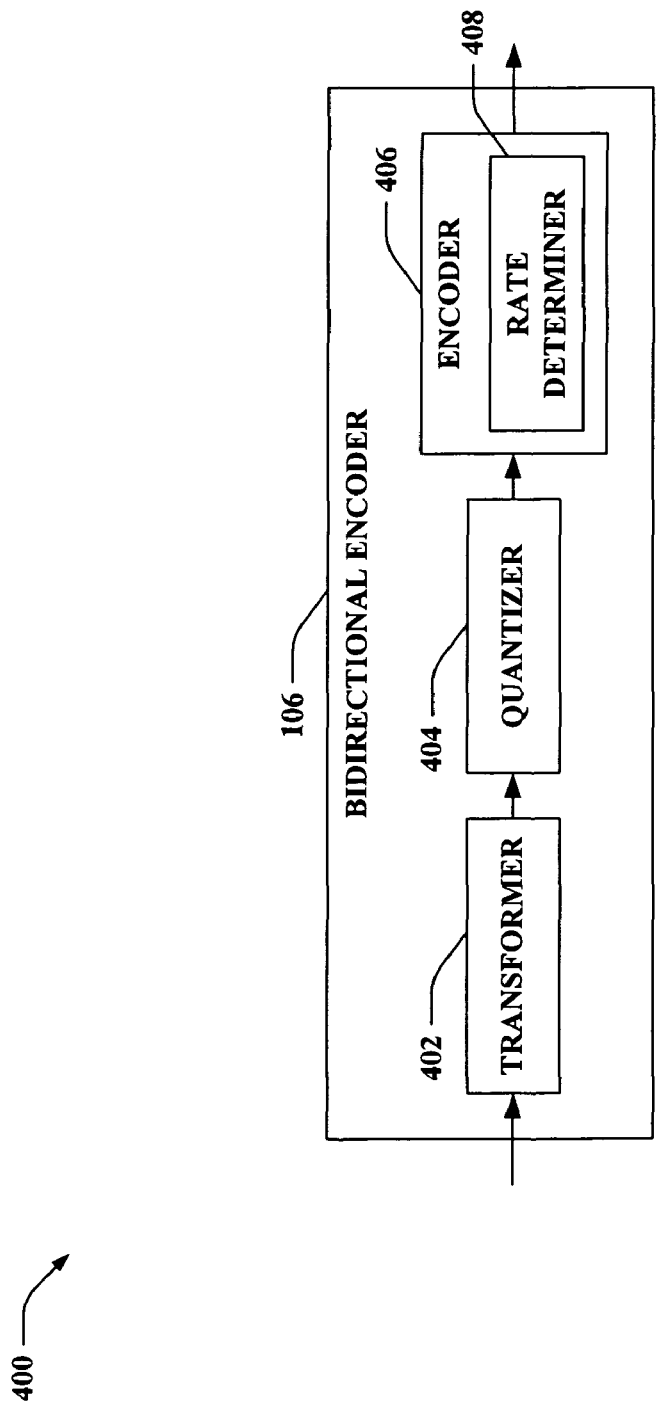
FIG. 4 is an illustration of an example system that employs a bidirectionally decodable Wyner-Ziv video coding scheme.

Now turning to FIG. 4, illustrated is a system 400 that employs a bidirectionally decodable Wyner-Ziv video coding scheme. The system 400 includes the bidirectional encoder 106, which can further include a transformer 402, a quantizer 404, and an encoder 406. Moreover, the encoder 406 can further comprise a rate determiner 408.

The idea of Wyner-Ziv video coding (WZVC) in general is to consider a prediction frame as a noisy version of a current frame. An encoder encodes the current frame by error correction codes in a way that a decoder can reconstruct the current frame by using the codes to correct the prediction frame. In comparison, the bidirectional encoder 106 can implement the bidirectionally decodable Wyner-Ziv video coding scheme, which is a WZVC scheme with stronger error correction codes such that a decoder (e.g., the decoder 116 of FIG. 1, . . . ) can reconstruct the current frame by correcting either the forward prediction frame or the backward prediction frame. Moreover, the bidirectional encoder 106 can encode frames as follows.

A current frame from a sequence of video frames can be obtained by the bidirectional encoder 106. The transformer 402 can perform a 4×4 integer cosine transform (ICT) on the current frame, thus obtaining 16 different bands of coefficients $X(i)$, where $i=1, \ldots, 16$ indicates different frequencies. Then, the quantizer 404 can quantize each band of coefficients into several bitplanes $B(i,k)$. Moreover, the encoder 406 can encode each bitplane by utilizing an error correction code (e.g., a low density parity check (LDPC) code such as an adaptive LDPC code, a Turbo code, . . . ). The rate determiner 408 can identify a rate of the error correction code by estimating joint statistics of the current frame, a last frame prior to the current frame, and a next frame subsequent to the current frame. Further, the rate determiner 408 can identify a rate $r_0(i,k)$ of the LDPC code at the bidirectional encoder 106 using the following two-pass algorism which simulates both forward decoding and backward decoding.

In the first pass, the rate determiner 408 can encode and decode the frames (e.g., in the current GOP) in normal temporal order. For each M-frame, forward motion estimation can be performed and a respective forward prediction frame of the M-frame (e.g., the frame immediately prior to the M-frame, . . . ) can be transformed into 16 different bands of discrete cosine transform (DCT) coefficients $Y_1(i)$. Then, from high frequency to low frequency, from most significant bit (MSB) to least significant bit (LSB), decoding can be simulated for each bitplane $B(i,k)$ to find a minimum rate $r_1(i,k)$ that guarantees lossless reconstruction of $B(i,k)$. In decoding $B(i,k)$, both $Y_1(i)$ and the decoded bitplanes $B(i,k-1), B(i,k-2), \ldots, B(i,MSB)$ are used as side information.

In the second pass, the rate determiner 408 can encode and decode the frames in reverse temporal order. Similar to the first pass, a minimum rate $r_2(i,k)$ can be found for each bitplane. Further, the final rate $r_0(i,k)$ of each bitplane can be determined by:

$$r_0(i,k) = \max(r_1(i,k), r_2(i,k)) \quad (1)$$

It is to be noted that motion estimation can be performed at the bidirectional encoder 106 (e.g., the video transmission component 102 of FIG. 1, . . . ) and motion vectors can be sent to the decoder (e.g., the decoder 116 of FIG. 1, the video reception component 104 of FIG. 1, . . . ) because the purpose is not to implement low complexity Wyner-Ziv encoding.

Moreover, D can denote reconstruction distortion, $R_1$ can be a minimum rate of DCT coefficients for forward decoding, $R_2$ can be a minimum rate for backward decoding, and $R_0$ can be a minimum rate for supporting both forward and backward decoding. $R_0$ also can be a storage cost at a server. Thus, the following can be obtained:

$$R_l = \sum_{i,k} r_l(i,k), \, l = 0, 1, 2 \quad (2)$$

$R_1$ can be most important and $R_2$ can be least important because generally the decoder can play the video frames in forward order. The foregoing can support first minimizing $R_1$ in a first pass of the two step algorism and then minimizing $R_0$ in the second pass of the two step algorism. Moreover, although $R_2$ need not be optimized, $R_2$ can be bounded by $R_2 \leq R_0$.

Although illustrated as being included in the bidirectional encoder 106, it is to be appreciated that one or more (or a portion thereof) of the transformer 402, the quantizer 404, and/or the encoder 406 can be separate from the bidirectional encoder 106. Moreover, it is to be appreciated that the bidirectional encoder 106 can effectuate operations performed by one or more of the transformer 402, the quantizer 404, the encoder 406, and/or the rate determiner 408.

Figure 5:
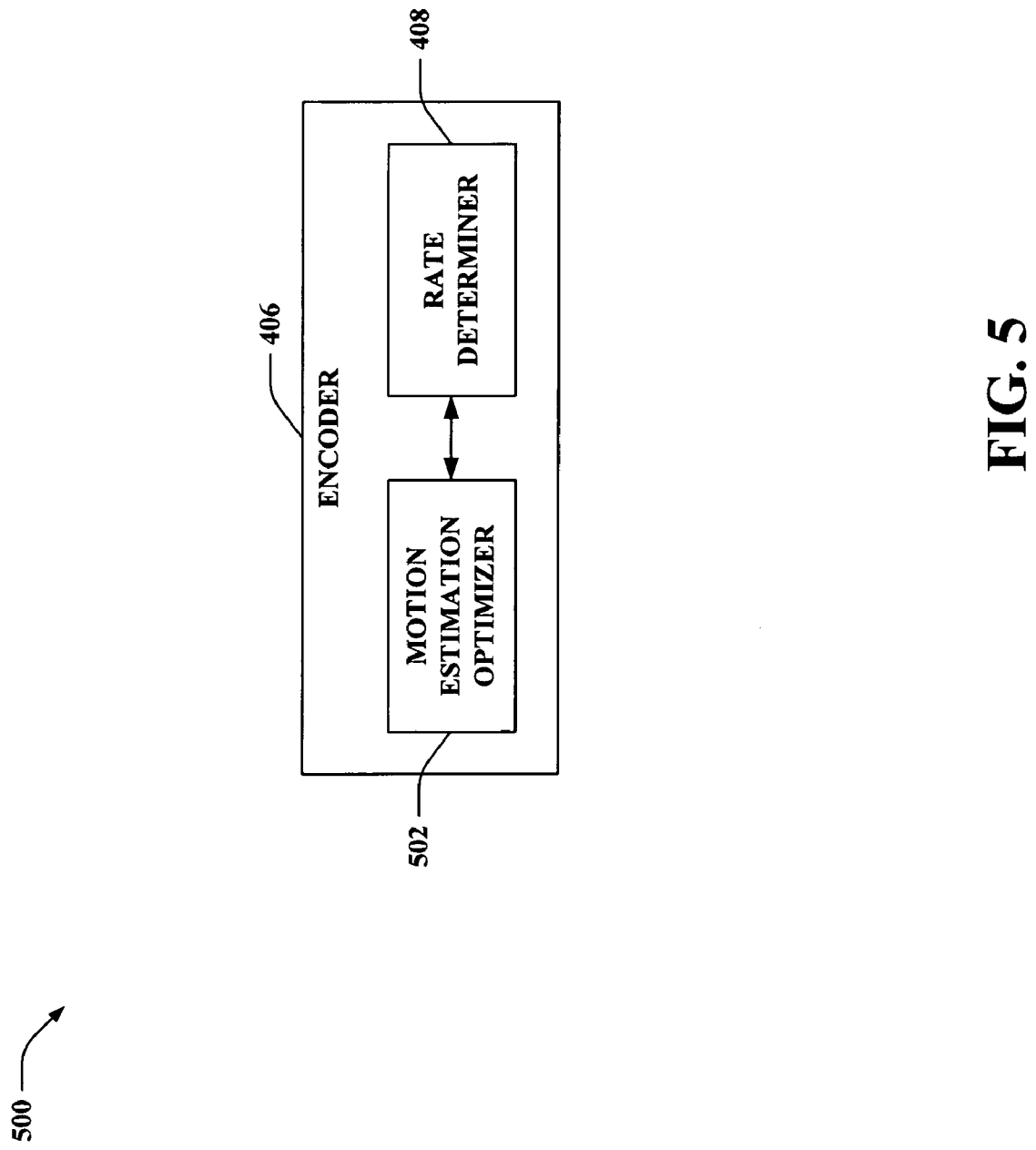
FIG. 5 is an illustration of an example system that employs Lagrangian optimized motion estimation in connection with bidirectionally decodable Wyner-Ziv video coding.

Referring to FIG. 5, illustrated is a system 500 that employs Lagrangian optimized motion estimation in connection with bidirectionally decodable Wyner-Ziv video coding. The system 500 includes the encoder 406, which can further include the rate determiner 408 and a motion estimation optimizer 502 that determines and/or utilizes optimized Lagrangian multiplier(s) in connection with motion estimation. Although shown as being included in the encoder 406 and separate from the rate determiner 408, it is to be appreciated that the motion estimation optimizer 502 can be separate from the encoder 406 or included in the rate determiner 408 (e.g., the rate determiner 408 can effectuate operations performed by the motion estimation optimizer 502 as described below, . . . ).

In motion estimation (ME), the below Lagrangian cost function can be minimized by the motion estimation optimizer 502:

$$J_{ME} = D_{DFD} + \lambda R_{ME} \quad (3)$$

Here, the prediction distortion $D_{DFD}$ (displaced frame difference) is weighted against a motion vector (MV) cost $R_{ME}$ using a Lagrangian multiplier $\lambda$. Note that here it is assumed that sum squared differences (SSD) is used in motion estimation. If sum of absolute differences (SAD) is used, then $\sqrt{\lambda}$ is employed as the Lagrangian multiplier in Equation 3. However, this will not affect the following derivation of optimal $\lambda$.

In the first pass, the optimal $\lambda$ follows:

$$-\frac{1}{\lambda} = \frac{dR_1}{dD} \quad (4)$$

For example, $\lambda = 0.85Q^2$, where Q is quantization step size.

In the second pass, all $r_1(i,k)$ are fixed, which can lead to the following:

$$-\frac{1}{\lambda'} = \frac{dR_0}{dD}\bigg|_{r_1} = \alpha \frac{dR_2}{dD} = -\frac{\alpha}{\lambda} \Rightarrow \lambda' = \frac{\lambda}{\alpha} \quad (5)$$

where $$\alpha = \frac{dR_0}{dD}\bigg|_{r_1} \bigg/ \frac{dR_2}{dD} = \left(\sum_{r_2(i,k) > r_1(i,k)} \frac{dr_2(i,k)}{dD}\right) \bigg/ \left(\sum_{i,k} \frac{dr_2(i,k)}{dD}\right)$$

Moreover, $\alpha$ depends on the percentage of bitplanes which satisfy $r_2(i,k) > r_1(i,k)$, and $0 < \alpha < 1$.

Therefore, $\lambda' = 0.85\alpha^{-1}Q^2 > \lambda$. This means the weight of the prediction error in Equation 3 can be decreased in the second pass. An intuitive explanation can be that in the second pass a larger prediction error may or may not increase the total rate $R_0$. For example, if $r_1 > r_2$ in Equation 1, then a larger prediction error increase $r_2$ may not affect the total rate $r_0 = \max(r_1, r_2)$.

According to an illustration, $\lambda'$ can be calculated by a before motion estimation. Pursuant to a further example, $\alpha = 0.5$ because statistically the forward bitrate $r_1(i,k)$ and backward bitrate $r_2(i,k)$ can have equal chance to be larger than each other. It is to be appreciated, however, that the claimed subject matter is not limited to the aforementioned example.

Figure 6:
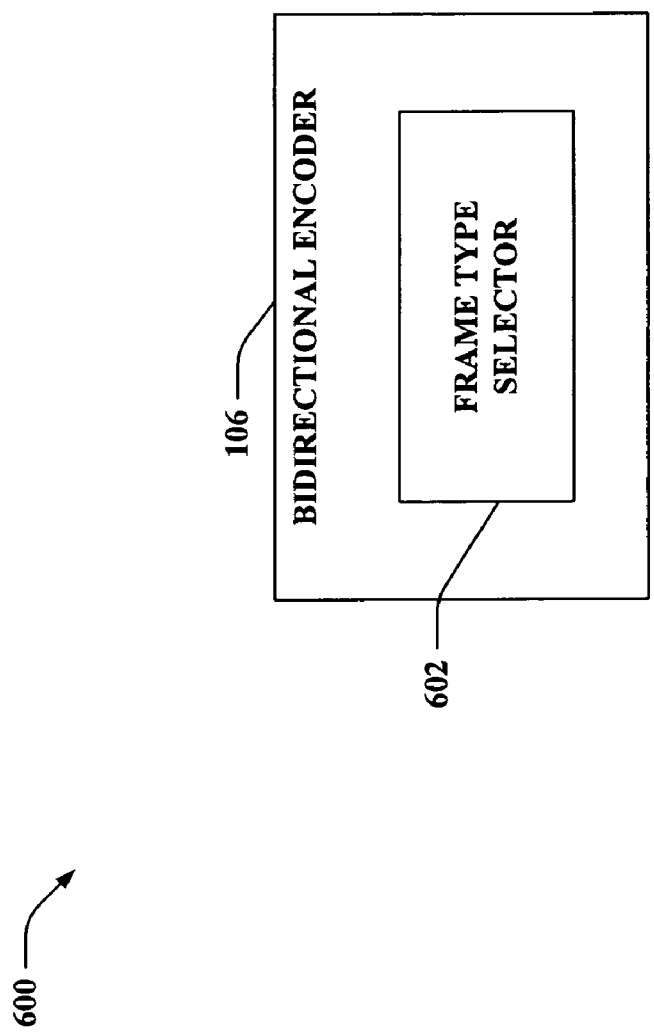
FIG. 6 is an illustration of an example system that uses a hybrid scheme for video coding that combines M-frame(s) and P-frame(s) in a group of pictures.

Turning to FIG. 6, illustrated is a system 600 that uses a hybrid scheme for video coding that combines M-frame(s) and P-frame(s) in a group of pictures. The system 600 includes the bidirectional encoder 106 that can receive video data and output encoded data for transmission over a channel. Moreover, the bidirectional encoder 106 can include a frame type selector 602 that determines a frame type to be utilized for each frame in a group of pictures. For example, the frame type selector 602 can identify an optimal combination/arrangement of M-frame(s) and P-frame(s) to include in a group of pictures between adjacent I-frames. The frame type selector 602 can determine whether to use both M-frames and P-frames, only M-frames, or only P-frames between adjacent I-frames. Moreover, the frame type selector 602 can decipher an optimal number of each type of frame for use in a group of pictures. Thereafter, the bidirectional encoder 106 can employ such information related to the selected type(s) of frames to use and number of each of the selected types to yield encoded frames per the optimal selection yielded by the frame type selector 602.

An M-frame is error resilient when transmitted over an error prone channel. However, an M-frame can have lower rate-distortion (R-D) performance than an H.264 P-frame when transmitted over a lossless channel. This indicates that, even in an error case, the P-frame can be more efficient than the M-frame when the decoder can obtain the forward prediction frame in high probability.

Thus, the frame type selector 602 can implement a hybrid scheme which use both P-frames and M-frames. Let n be the group of pictures (GOP) length, and p be the frame loss rate. The frame type selector 602 can enable the bidirectional encoder 106 to encode the m−1 frames after the I-frame as P-frames, and encode the remaining n−m frames as M-frames. Suppose $g_1$ is the distortion reduction of using a P-frame (compared with an M-frame) when the current frame is forward decodable, and $g_2$ is the distortion increase of using a P-frame when the P-frame is not forward decodable but the M-frame is backward decodable. For the frame m−1, the expected distortion reduction of encoding it as a P-frame (over M-frame) is:

$$G(m) = g_1(1-p)^m - g_2(1-(1-p)^{m-1})(1-p)^{n-m+2} \quad (6)$$

An optimal m should follow $G(m) \geq 0$ otherwise it will be better to encode the frame m−1 as an M-frame. Also, an optimal m should follow $G(m+1) < 0$, otherwise it will be better to encode the frame m as a P-frame. Since G(m) is a decreasing function of m, the optimal m is unique and is the largest integer number which satisfies $G(m) > 0$. Notice that $m \leq 1$ means all frames are encoded as M-frames, and $m > n$ means all frames are encoded as P-frame.

According to an illustration, $g_1$ can be obtained by subtracting the mean square error (MSE) of the M-frame and the P-frame when both are correctly decodable, and $g_2$ can be estimated by subtracting the MSE of the M-frame and the P-frame when the frame is backward decodable but not forward decodable (by assuming its previous frame is lost). However, the claimed subject matter is not so limited.

Figure 7:
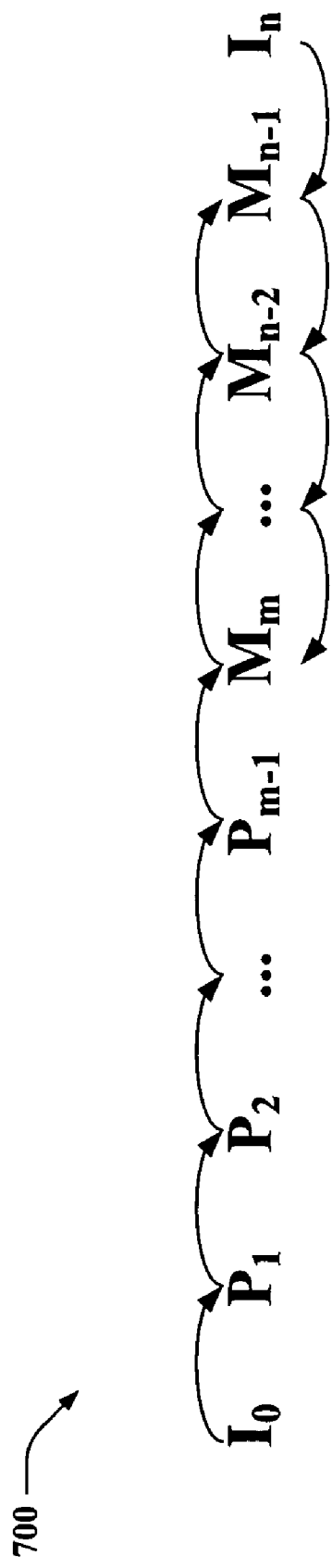
FIG. 7 is an illustration of an example sequence of a video coding pattern that employs a hybrid scheme with an optimal M-frame/P-frame selection.

Referring to FIG. 7, illustrated is an example sequence 700 of a video coding pattern that employs a hybrid scheme with an optimal M-frame/P-frame selection. The sequence 700 can include I-frames, P-frames, and M-frames. For instance, an I-frame (e.g., $I_0$, . . . ) can be a first frame of a group of pictures. Moreover, the next m−1 frames in the sequence 700 after the I-frame can be P-frames (e.g., $P_1$-$P_{m-1}$, . . . ). Thereafter, the remaining n−m frames in the group of pictures can be M-frames (e.g., $M_m$-$M_{n-1}$, ... ). Moreover, a next group of pictures can begin again with another I-frame (e.g., $I_n$, ... ) Further, as shown by the arrows, the P-frames can be forward decodable while the M-frames can be both forward decodable and backward decodable.

Figure 8:
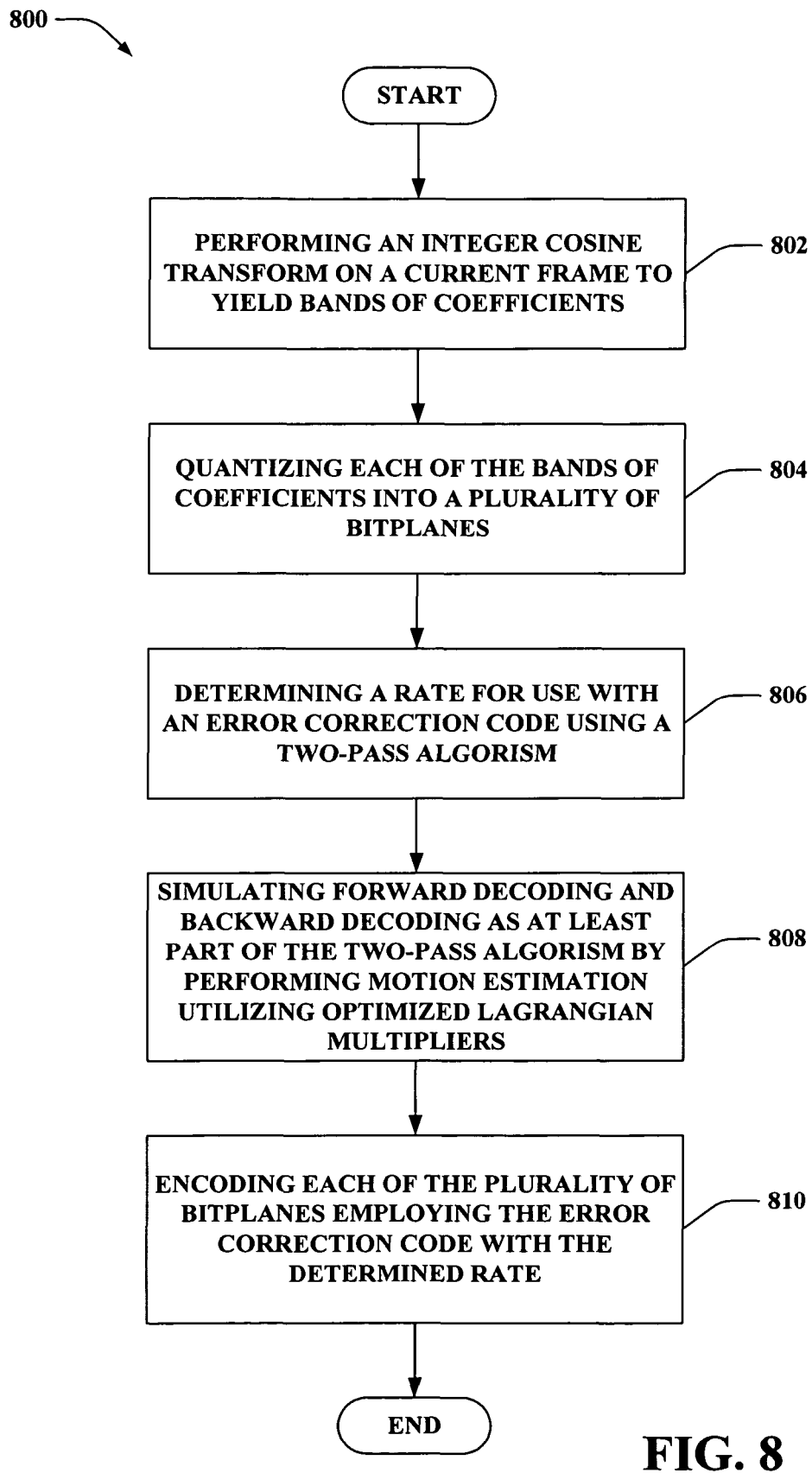
FIG. 8 is an illustration of an example methodology that facilitates employing bidirectionally decodable Wyner-Ziv video coding for video transmission.
Figure 9:
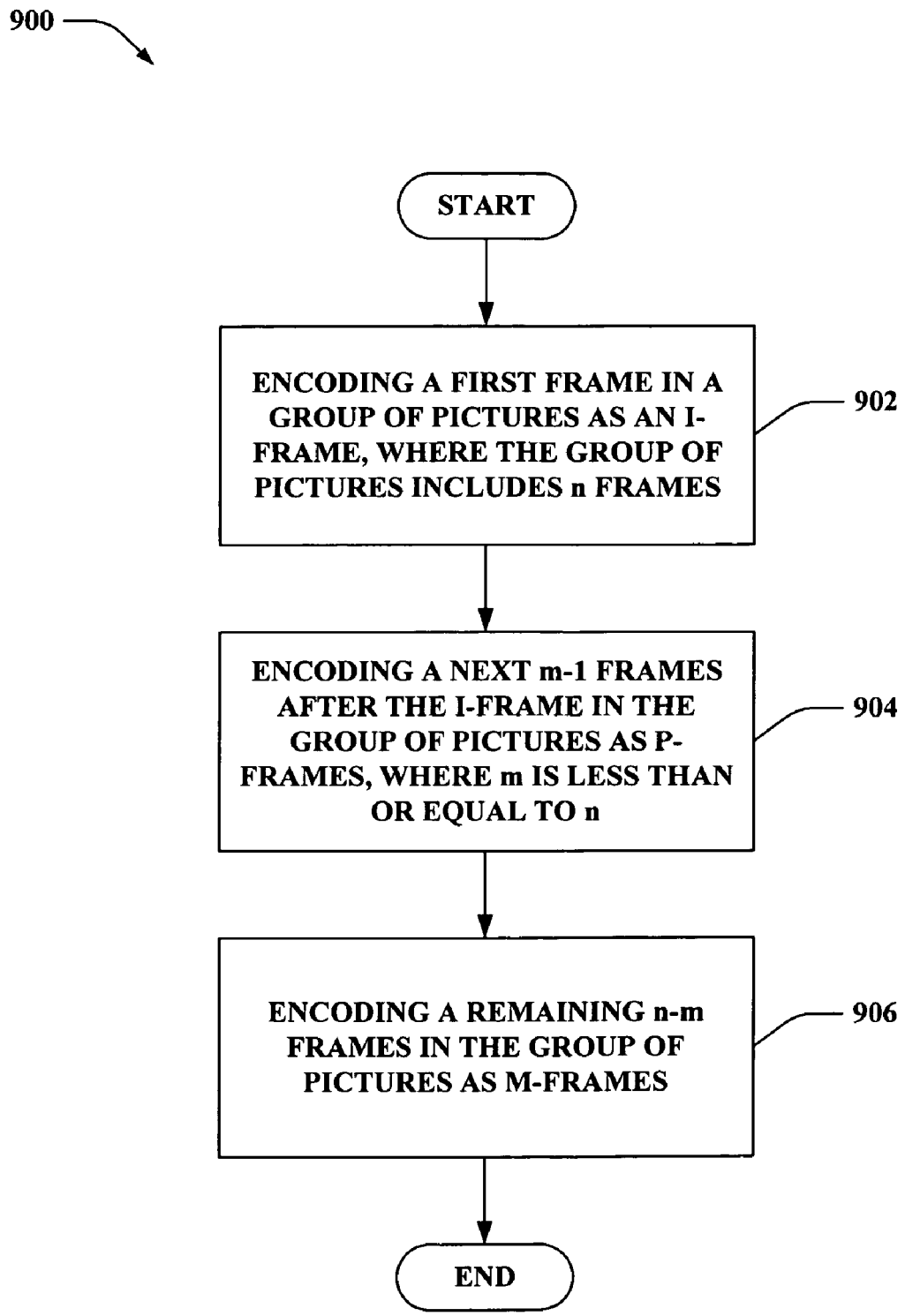
FIG. 9 is an illustration of an example methodology that facilitates employing a hybrid scheme that combines optimally selected M-frames and P-frames in a group of pictures.

Referring now to FIGS. 8-9, methodologies that can be implemented in accordance with various aspects described herein are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodologies in accordance with the claimed subject matter.

Furthermore, the claimed subject matter may be described in the general context of computer-executable instructions, such as program modules, executed by one or more components. Generally, program modules include routines, programs, objects, data structures, etc., that perform particular tasks or implement particular abstract data types. Typically the functionality of the program modules may be combined or distributed as desired in various embodiments. Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers, ... ). Such components, inter alia, can automate certain mechanisms or processes performed thereby to make portions of the systems and methods more adaptive as well as efficient and intelligent.

Referring now to FIG. 8, illustrated is an example methodology 800 that facilitates employing bidirectionally decodable Wyner-Ziv video coding for video transmission. At 802, an integer cosine transform (ICT) can be performed on a current frame to yield bands of coefficients. For instance, a 4×4 ICT can be effectuated to yield 16 different bands of coefficients X(i), where i=1, ... , 16 indicates different frequencies. At 804, each of the bands of coefficients can be quantized into a plurality of bitplanes. At 806, a rate for use with an error correction code can be determined using a two-pass algorism. The error correction code, for example, can be a low density parity check (LDPC) code, a Turbo code, and so forth. For instance, the rate can be determined at an encoder. Further, in the first pass, frames in a current group of pictures can be encoded and decoded in temporal order. Moreover, in the second pass, frames in the current group of pictures can be encoded and decoded in reverse temporal order. At 808, forward decoding and backward decoding can be simulated as at least part of the two-pass algorism by performing motion estimation utilizing optimized Lagrangian multipliers. For instance, a Lagrangian cost function, which weights predicted distortion against motion vector cost using the Lagrangian multipliers, can be minimized as part of motion estimation. According to another example, optimal Lagrangian multipliers for forward motion estimation and backward motion estimation can be determined. Pursuant to a further illustration, the optimal Lagrangian multiplier for backward motion estimation can be approximately twice as large on average as the optimal Lagrangian multiplier for forward motion estimation. At 810, each of the plurality of bitplanes can be encoded employing the error correction code (e.g., LDPC code, Turbo code, ... ) with the determined rate.

Now turning to FIG. 9, illustrated is an example methodology 900 that facilitates employing a hybrid scheme that combines optimally selected M-frames and P-frames in a group of pictures. At 902, a first frame in a group of pictures can be encoded as an I-frame, where the group of pictures includes n frames. At 904, a next m−1 frames after the I-frame in the group of pictures can be encoded as P-frames, where m is less than or equal to n. At 906, a remaining n−m frames in the group of pictures can be encoded as M-frames. Further, an optimal value of m can be determined as a function of at least distortion reduction of using a P-frame rather than an M-frame when the current frame is forward decodable, distortion increase of using a P-frame when that P-frame is not forward decodable but an M-frame is backward decodable, and a frame loss rate. For instance, the optimal value of m can provide an expected distortion reduction of encoding frame m as a P-frame versus encoding frame m as an M-frame greater than or equal to zero and m+1 can provide an expected distortion reduction of encoding frame m+1 as a P-frame versus encoding frame m+1 as an M-frame less than zero.

The efficacy of the above described embodiments can be verified by simulated results, as presented in non-limiting fashion in FIGS. 10-14. In the simulations, results from a series of experiments on the bidirectionally decodable Wyner-Ziv video decoding scheme are shown. For instance, evaluations of the performance of the Lagrangian optimized motion estimation technique and the optimal M-frame/P-frame selection are provided. These schemes are also compared with H.264 and other schemes that support reserve playback. As simulated, the test GOP length is 11, and the I-frames are encoded by an H.264 encoder after every 10 inter frames. In H.264, each of the inter frames are encoded as a P-frame, while, in the bidirectionally decodable Wyner-Ziv video decoding schemes, each of the inter frames are encoded as bidirectionally decodable M-frames.

In motion estimation, 7 different variable block sizes from 4×4 to 16×16 are utilized in the simulations, which can be the same as in H.264. The forward MVs and block modes are encoded by the context adaptive variable length coder (CAVLC) in H.264. The backward MVs are predicted by the forward MVs, then the prediction residue and the block modes are also encoded by the CAVLC in H.264. Further, in the simulations, integer motion vector accuracy can be used.

Figure 10:
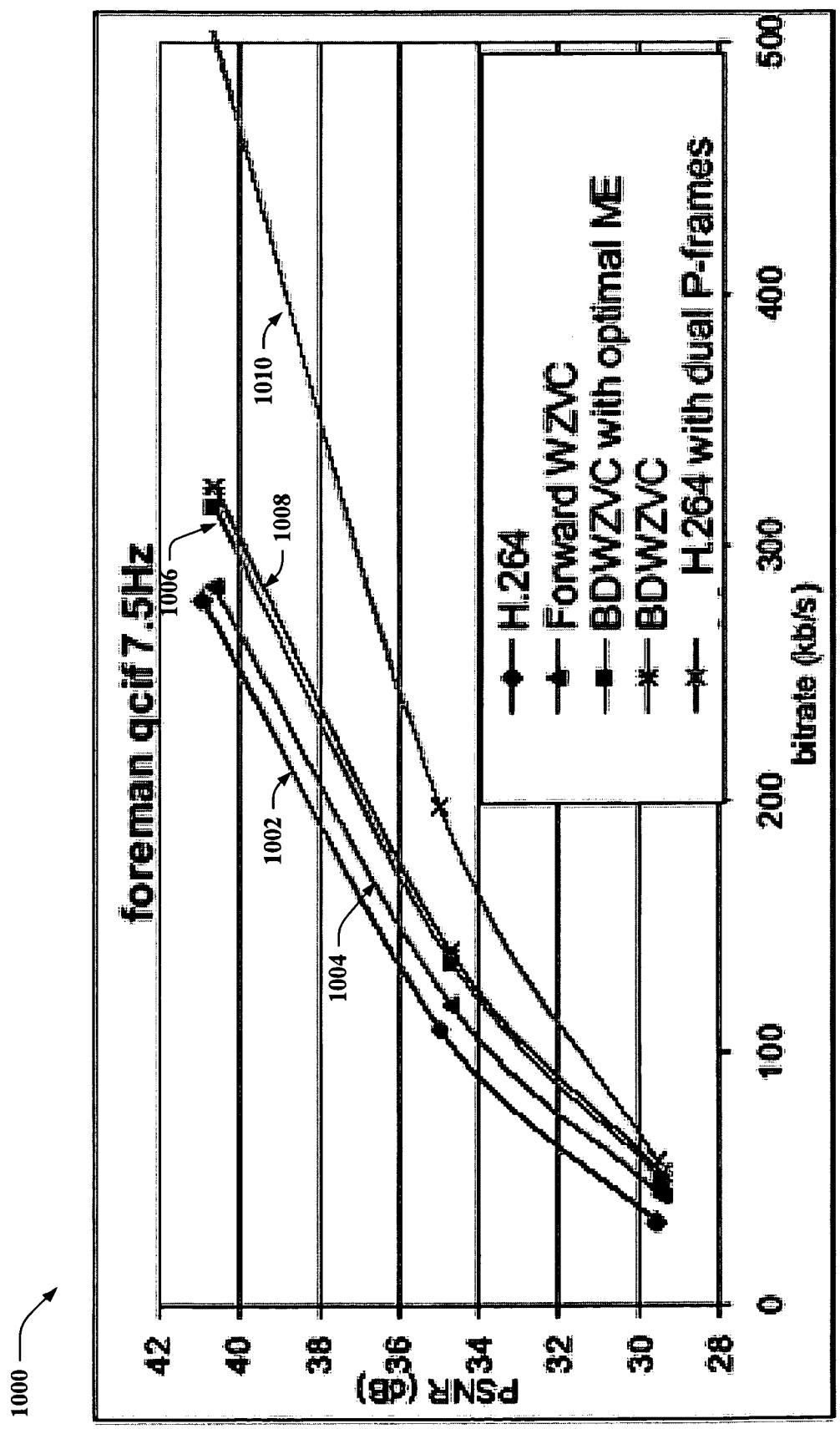
Figure 11:
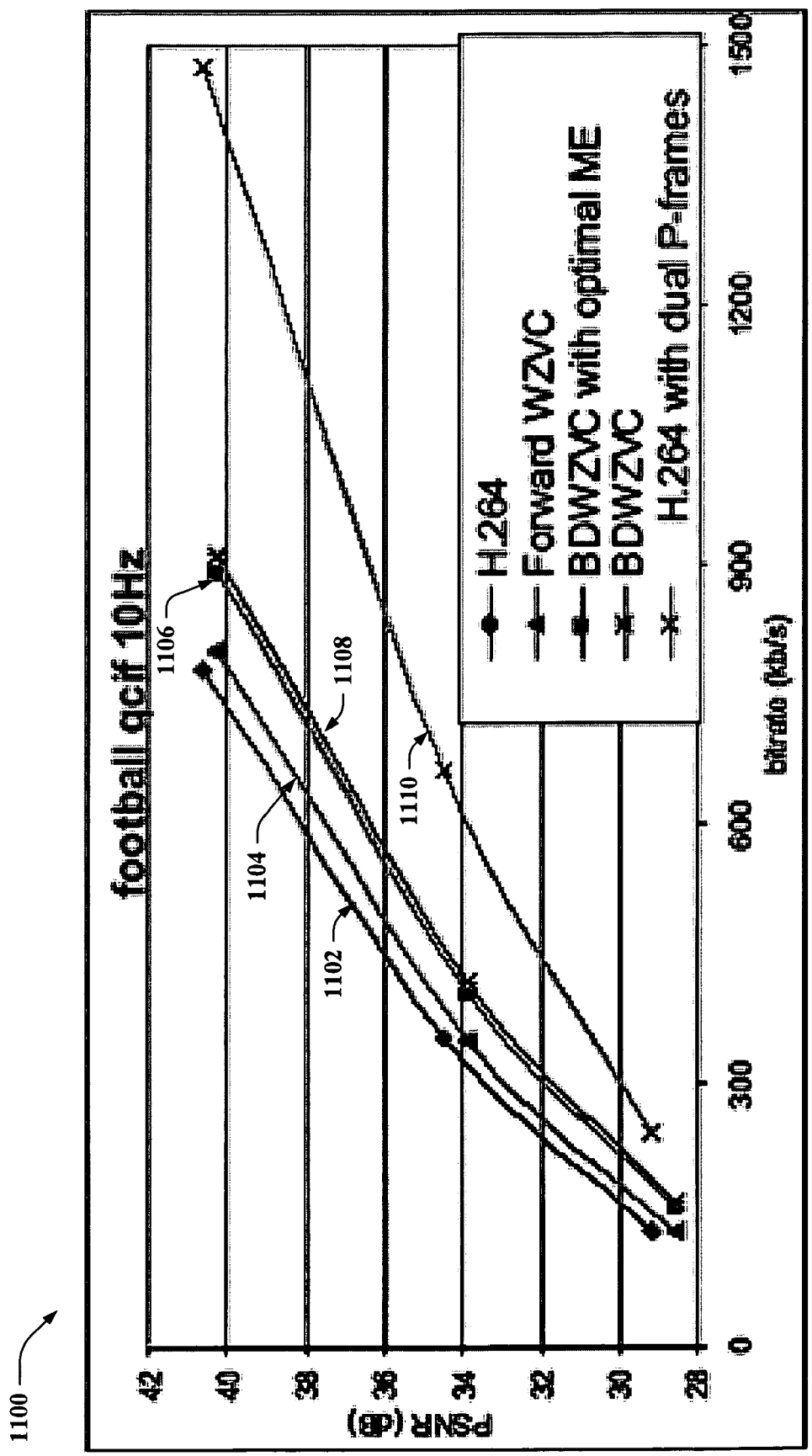

FIGS. 10-11 illustrate comparisons of compression efficiency between schemes. As shown, bitrates (kb/s) versus peak signal-to-noise ratios (PSNR) (dB) are plotted showing results for each of the schemes upon two videos with differing frame rates. In FIG. 10, graph 1000 depicts results related to a frame rate of 7.5 Hz for a 'foreman qcif' video. Graph 1000 of FIG. 10 includes curve 1002 that represents bitrate versus PSNR for H.264, curve 1004 that illustrates bitrate versus PSNR for forward WZVC (e.g., normal Wyner-Ziv scheme with motion estimation at the encoder), curve 1006 that represents bitrate versus PSNR for BDWZVC with optimal motion estimation, curve 1008 that illustrates bitrate versus PSNR for BDWZVC, and curve 1010 that illustrates bitrate versus PSNR for H.264 with dual P-frames. Moreover, in FIG. 11, graph 1100 depicts results related to a frame rate of 10 Hz for a 'football qcif' video. Graph 1100 of FIG. 11 includes curve 1102 that represents bitrate versus PSNR for H.264, curve 1104 that illustrates bitrate versus PSNR for forward WZVC, curve 1106 that represents bitrate versus PSNR for BDWZVC with optimal motion estimation, curve

1108 that illustrates bitrate versus PSNR for BDWZVC, and curve 1110 that illustrates bitrate versus PSNR for H.264 with dual P-frames.

Forward WZVC stands for a normal Wyner-Ziv scheme with motion estimation at the encoder. It also indicates the minimum number of bits that a decoder needs to receive for forward playback, from a BDWZVC server. Notice that the rate of BDWZVC is the storage cost in the server.

As seen in FIGS. 10-11, the proposed Lagrangian optimized motion estimation can improve the performance of the BDWZVC scheme by about 0.2 dB. Also shown, with the help of the optimized motion estimation, the bidirectionally decodable stream can lose less than 1 dB in average as compared with the forward Wyner-Ziv stream at the same bitrate. Thus, reversibility can be achieved with a cost of less than 1 dB. Compared with the H.264 based bidirectionally decodable scheme that utilizes dual P-frames, the BDWZVC with optimal motion estimation scheme can gain up to 4 dB with substantially similar storage size at the server.

Figure 12:
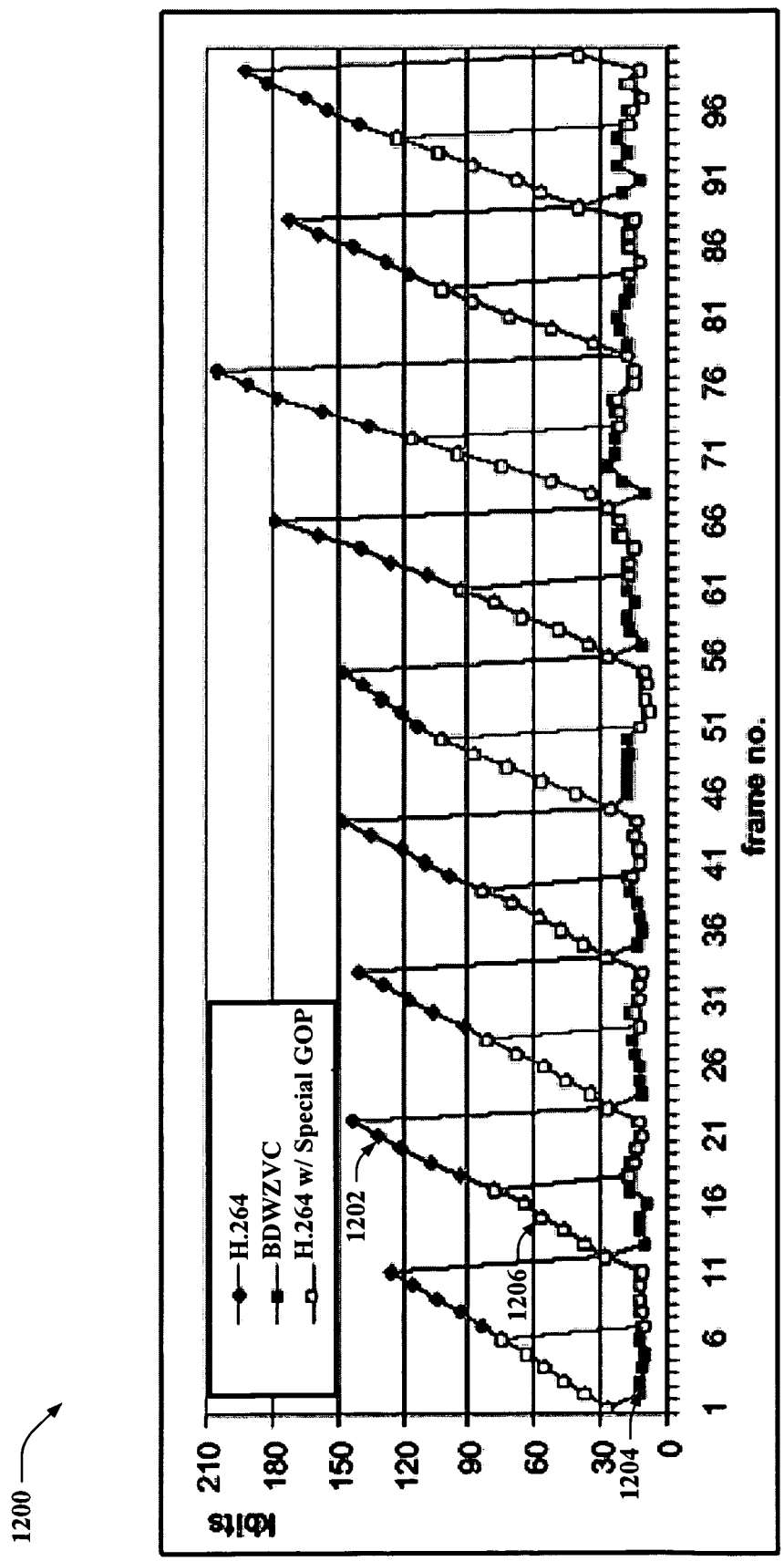

With reference to FIG. 12, a graph 1200 depicting bandwidth requirements for reverse play for various schemes is illustrated. In graph 1200, curve 1202 illustrates frame number versus bandwidth (kbits) for H.264, curve 1204 depicts frame number versus bandwidth (kbits) for BDWZVC, and curve 1206 shows frame number versus bandwidth (kbits) for H.264 with a special GOP structure.

As illustrated, the required bandwidth of reverse playback is given in graph 1200, which shows a frame-by-frame comparison of the number of bits transmitted over the network of the conventional H.264 system (e.g., curve 1202), the H.264 scheme with special GOP structure (e.g., curve 1206), and the bidirectionally decodable scheme (e.g., curve 1204). By comparing the curves 1202-1206, it can be seen that the bidirectionally decodable scheme is the only scheme in the simulation whose backward bandwidth is as low as forward bandwidth.

Figure 13:
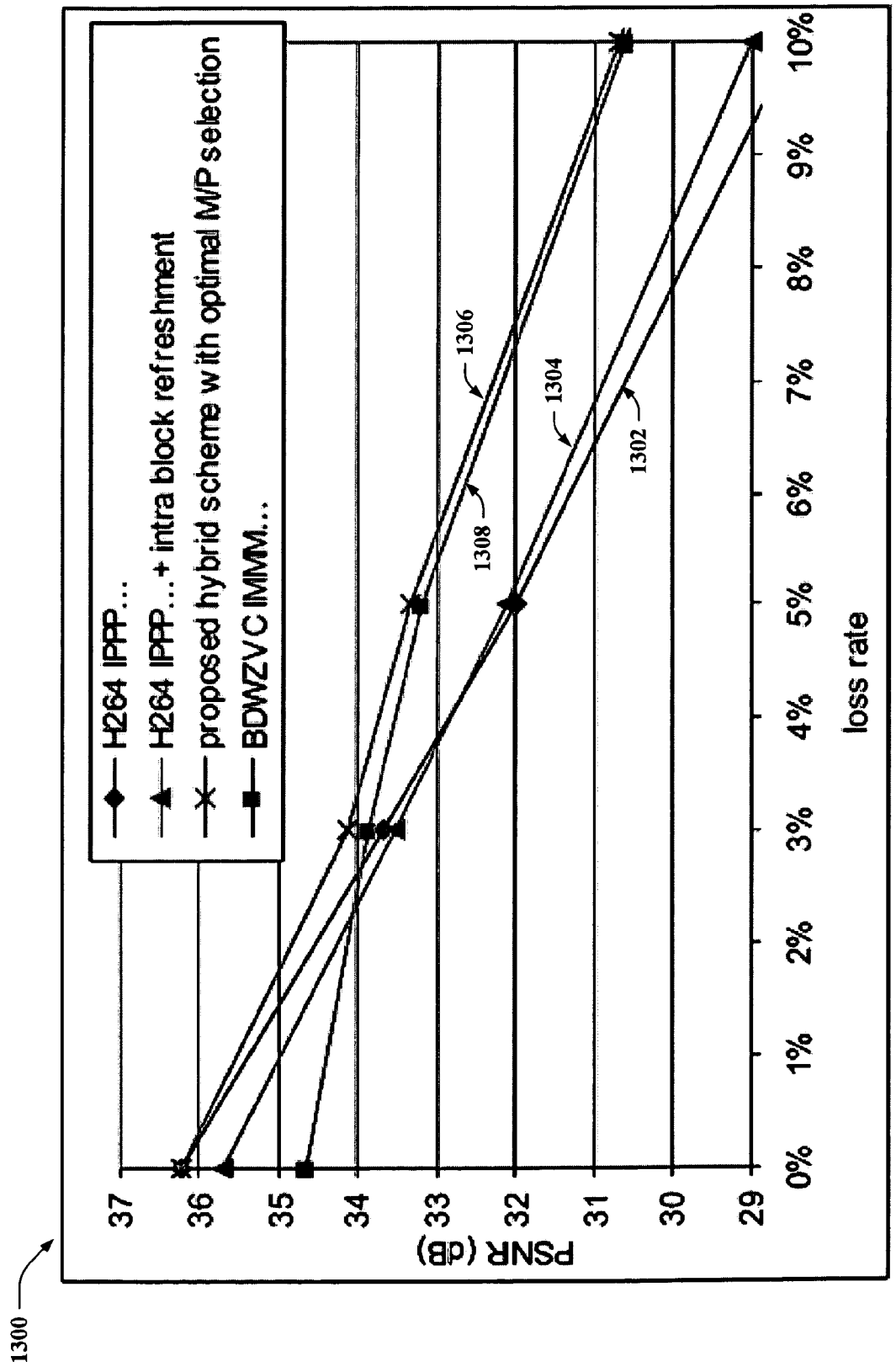

Turning to FIG. 13, illustrated is a graph 1300 comparing error resilience performance among differing schemes. Results shown in graph 1300 stem from an error resilience test performed upon the 'foreman qcif' video (e.g., from FIG. 10) at a bitrate of 139 kb/s. In graph 1300, curve 1302 shows loss rate versus PSNR (dB) for H.264 with a GOP structure of 'IPPP . . . ', curve 1304 shows loss rate versus PSNR for H.264 with a GOP structure of 'IPPP . . . ' with intra block refreshment (e.g., 10% intra block refreshment, . . . ), curve 1306 depicts loss rate versus PSNR for the hybrid scheme with optimal M-frame/P-frame selection as described herein, and curve 1308 illustrates loss rate versus PSNR for the BDWZVC scheme with a GOP structure of 'IMMM . . . '. The packet loss rate includes 0%, 3%, 5%, and 10%. For each packet loss rate, 100 different loss patterns are simulated. For instance, one packet can include one frame and those lost frames copy previous frames directly. As depicted in graph 1300, the hybrid scheme with optimal M-frame/P-frame selection performs the best. The hybrid scheme outperforms the BDWZVC scheme significantly at low package loss rates, and outperforms the other two H.264 schemes significantly at high package loss rates.

Referring to FIG. 14, illustrated is an example table 1400 that includes optimal values of m and corresponding gains related to optimal M-frame/P-frame selection for various frame loss rates. Table 1400 gives the optimal m calculated using Equation 6 for the 'foreman qcif' video at different bitrates and packet loss rates. Further, gains of the hybrid scheme over the original BDWZVC scheme are included in table 1400. For instance, it can be seen that the hybrid scheme can gain up to 0.55 dB when the packet loss rate is 3% (e.g., with a bitrate of 51.2 b/s).

As described herein, various techniques are provided to improve performance of BDWZVC schemes, which support both forward decoding and backward decoding. For instance, a Lagrangian optimized motion estimation technique can improve the R-D performance about 0.2 dB using a Lagrangian multiplier as set forth herein for backward motion estimation. According to another example, a hybrid scheme with optimal M-frame/P-frame selection can outperform other schemes including the BDWZVC scheme significantly in an error resilience test at low package loss rates, and can outperform schemes such as H.264 schemes up to 4 dB at high package loss rates.

Figure 15:
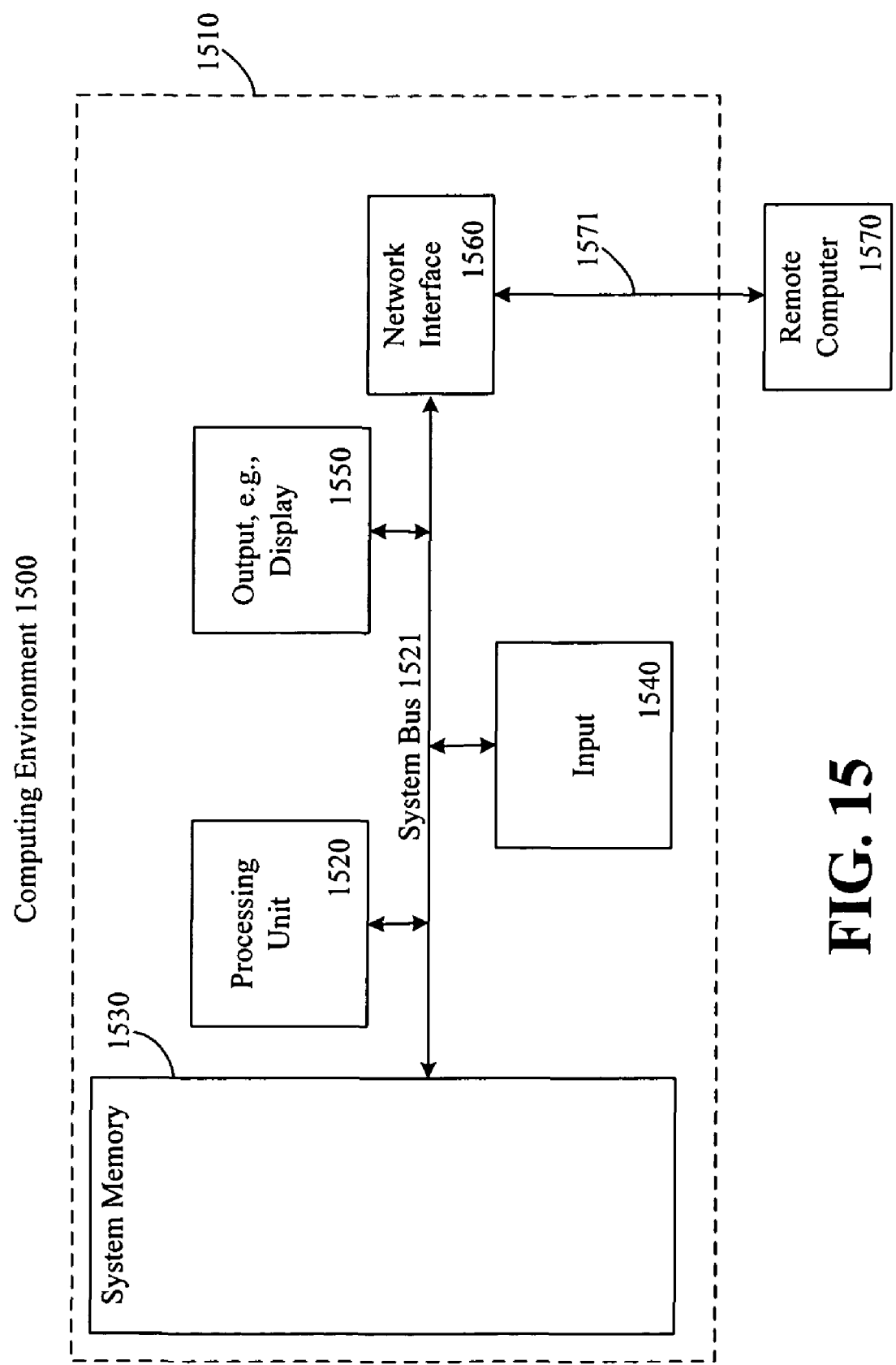
FIG. 15 is a block diagram of an example operating environment in which various aspects described herein can function.

Turning to FIG. 15, an exemplary non-limiting computing system or operating environment in which various aspects described herein can be implemented is illustrated. One of ordinary skill in the art can appreciate that handheld, portable and other computing devices and computing objects of all kinds are contemplated for use in connection with the claimed subject matter, e.g., anywhere that a communications system may be desirably configured. Accordingly, the below general purpose remote computer described below in FIG. 15 is but one example of a computing system in which the claimed subject matter can be implemented.

Although not required, the claimed subject matter can partly be implemented via an operating system, for use by a developer of services for a device or object, and/or included within application software that operates in connection with one or more components of the claimed subject matter. Software may be described in the general context of computer-executable instructions, such as program modules, being executed by one or more computers, such as clients, servers, mobile devices, or other devices. Those skilled in the art will appreciate that the claimed subject matter can also be practiced with other computer system configurations and protocols, where non-limiting implementation details are given.

FIG. 15 thus illustrates an example of a suitable computing system environment 1500 in which the claimed subject matter may be implemented, although as made clear above, the computing system environment 1500 is only one example of a suitable computing environment for a media device and is not intended to suggest any limitation as to the scope of use or functionality of the claimed subject matter. Further, the computing environment 1500 is not intended to suggest any dependency or requirement relating to the claimed subject matter and any one or combination of components illustrated in the example operating environment 1500.

With reference to FIG. 15, an example of a remote device for implementing various aspects described herein includes a general purpose computing device in the form of a computer 1510. Components of computer 1510 can include, but are not limited to, a processing unit 1520, a system memory 1530, and a system bus 1521 that couples various system components including the system memory to the processing unit 1520. The system bus 1521 can be any of several types of bus structures including a memory bus or memory controller, a peripheral bus, and a local bus using any of a variety of bus architectures.

Computer 1510 can include a variety of computer readable media. Computer readable media can be any available media that can be accessed by computer 1510. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1510. Communication media can embody computer readable instructions, data structures, program modules or other data in a modulated data signal such as a carrier wave or other transport mechanism and can include any suitable information delivery media.

The system memory 1530 can include computer storage media in the form of volatile and/or nonvolatile memory such as read only memory (ROM) and/or random access memory (RAM). A basic input/output system (BIOS), containing the basic routines that help to transfer information between elements within computer 1510, such as during start-up, can be stored in memory 1530. Memory 1530 can also contain data and/or program modules that are immediately accessible to and/or presently being operated on by processing unit 1520. By way of non-limiting example, memory 1530 can also include an operating system, application programs, other program modules, and program data.

The computer 1510 can also include other removable/non-removable, volatile/nonvolatile computer storage media. For example, computer 1510 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 1521 through a non-removable memory interface such as an interface, and a magnetic disk drive or optical disk drive can be connected to the system bus 1521 by a removable memory interface, such as an interface.

A user can enter commands and information into the computer 1510 through input devices such as a keyboard or a pointing device such as a mouse, trackball, touch pad, and/or other pointing device. Other input devices can include a microphone, joystick, game pad, satellite dish, scanner, or the like. These and/or other input devices can be connected to the processing unit 1520 through user input 1540 and associated interface(s) that are coupled to the system bus 1521, but can be connected by other interface and bus structures, such as a parallel port, game port or a universal serial bus (USB). A graphics subsystem can also be connected to the system bus 1521. In addition, a monitor or other type of display device can be connected to the system bus 1521 via an interface, such as output interface 1550, which can in turn communicate with video memory. In addition to a monitor, computers can also include other peripheral output devices, such as speakers and/or a printer, which can also be connected through output interface 1550.

The computer 1510 can operate in a networked or distributed environment using logical connections to one or more other remote computers, such as remote computer 1570, which can in turn have media capabilities different from device 1510. The remote computer 1570 can be a personal computer, a server, a router, a network PC, a peer device or other common network node, and/or any other remote media consumption or transmission device, and can include any or all of the elements described above relative to the computer 1510. The logical connections depicted in FIG. 15 include a network 1571, such local area network (LAN) or a wide area network (WAN), but can also include other networks/buses. Such networking environments are commonplace in homes, offices, enterprise-wide computer networks, intranets and the Internet.

When used in a LAN networking environment, the computer 1510 is connected to the LAN 1571 through a network interface or adapter. When used in a WAN networking environment, the computer 1510 can include a communications component, such as a modem, or other means for establishing communications over the WAN, such as the Internet. A communications component, such as a modem, which can be internal or external, can be connected to the system bus 1521 via the user input interface at input 1540 and/or other appropriate mechanism. In a networked environment, program modules depicted relative to the computer 1510, or portions thereof, can be stored in a remote memory storage device. It should be appreciated that the network connections shown and described are exemplary and other means of establishing a communications link between the computers can be used.

Figure 16:
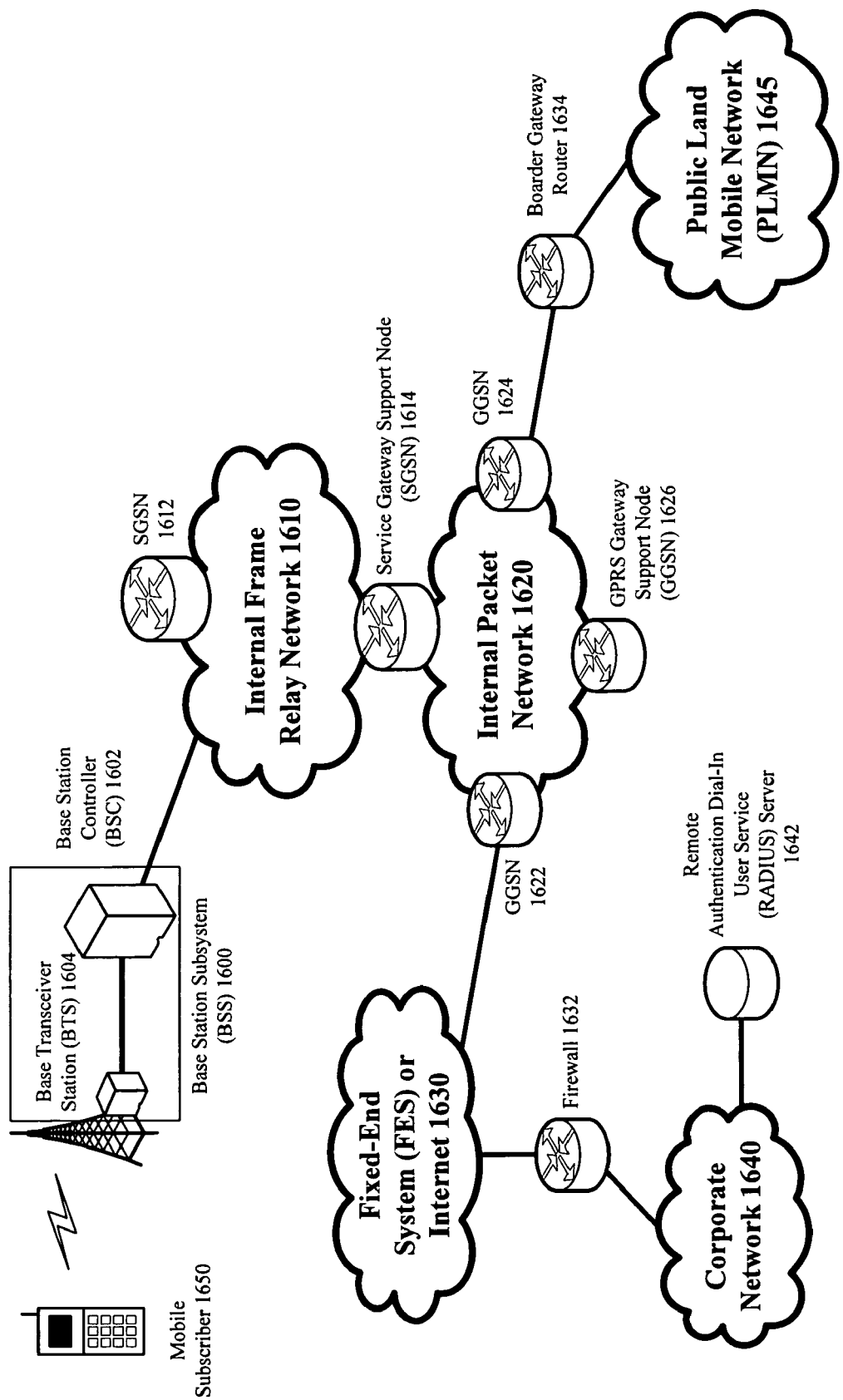
FIG. 16 illustrates an example wireless communication network in which various aspects described herein can be utilized.

Turning now to FIG. 16, an overview of a network environment in which the claimed subject matter can be implemented is illustrated. The above-described systems and methodologies for timing synchronization may be applied to any wireless communication network; however, the following description sets forth an exemplary, non-limiting operating environment for said systems and methodologies. The below-described operating environment should be considered non-exhaustive, and thus the below-described network architecture is merely an example of a network architecture into which the claimed subject matter can be incorporated. It is to be appreciated that the claimed subject matter can be incorporated into any now existing or future alternative architectures for communication networks as well.

FIG. 16 illustrates various aspects of the global system for mobile communication (GSM). GSM is one of the most widely utilized wireless access systems in today's fast growing communications systems. GSM provides circuit-switched data services to subscribers, such as mobile telephone or computer users. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

As one of ordinary skill in the art can appreciate, the exemplary GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the timing synchronization techniques described herein may be applied independently of the method of data transport, and does not depend on any particular network architecture or underlying protocols.

FIG. 16 depicts an overall block diagram of an exemplary packet-based mobile cellular network environment, such as a GPRS network, in which the claimed subject matter can be practiced. Such an environment can include a plurality of Base Station Subsystems (BSS) 1600 (only one is shown), each of which can comprise a Base Station Controller (BSC) 1602 serving one or more Base Transceiver Stations (BTS) such as BTS 1604. BTS 1604 can serve as an access point where mobile subscriber devices 1650 become connected to the wireless network. In establishing a connection between a mobile subscriber device 1650 and a BTS 1604, one or more timing synchronization techniques as described supra can be utilized.

In one example, packet traffic originating from mobile subscriber 1650 is transported over the air interface to a BTS 1604, and from the BTS 1604 to the BSC 1602. Base station subsystems, such as BSS 1600, are a part of internal frame relay network 1610 that can include Service GPRS Support Nodes ("SGSN") such as SGSN 1612 and 1614. Each SGSN is in turn connected to an internal packet network 1620 through which a SGSN 1612, 1614, etc., can route data packets to and from a plurality of gateway GPRS support nodes (GGSN) 1622, 1624, 1626, etc. As illustrated, SGSN 1614 and GGSNs 1622, 1624, and 1626 are part of internal packet network 1620. Gateway GPRS serving nodes 1622, 1624 and 1626 can provide an interface to external Internet Protocol ("IP") networks such as Public Land Mobile Network ("PLMN") 1645, corporate intranets 1640, or Fixed-End System ("FES") or the public Internet 1630. As illustrated, subscriber corporate network 1640 can be connected to GGSN 1622 via firewall 1632; and PLMN 1645 can be connected to GGSN 1624 via boarder gateway router 1634. The Remote Authentication Dial-In User Service ("RADIUS") server 1642 may also be used for caller authentication when a user of a mobile subscriber device 1650 calls corporate network 1640.

Generally, there can be four different cell sizes in a GSM network—macro, micro, pico, and umbrella cells. The coverage area of each cell is different in different environments. Macro cells can be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, no single embodiment shall be considered limiting, but rather the various embodiments and their equivalents should be construed consistently with the breadth, spirit and scope in accordance with the appended claims.

What is claimed is:

1. A system, comprising:
a bidirectional encoder configured to encode video data using bidirectionally decodable Wyner-Ziv video coding to generate encoded video frames for transfer over a channel, wherein the encoded video frames include at least one M-frame, and the at least one M-frame is a P-frame with multiple decoder selectable reference frames at the bidirectional encoder, and wherein the bidirectional encoder includes an encoder comprising a rate determiner configured to identify a rate of an error correction code using a two-pass algorithm that simulates forward decoding and backward decoding, and the rate determiner is further configured to encode and decode frames in a current group of pictures in temporal order for a first pass and encode and decode frames in the current group of pictures in reverse temporal order for a second pass.

2. The system of claim 1, wherein the at least one M-frame includes encoded difference information based upon comparisons with a previous frame and a subsequent frame, wherein the previous frame is one of an I-frame, a P-frame or an M-frame, whichever is closest to the at least one M-frame, and the subsequent frame is one of an I-frame, the P-frame or an M-frame, whichever is closest to the at least one M-frame.

3. The system of claim 1, wherein the bidirectional encoder further comprises:
a transformer configured to perform an integer cosine transform (ICT) on a current frame to generate different bands of coefficients; and
a quantizer configured to quantize the different bands of coefficients into a plurality of bitplanes, wherein the encoder is further
configured to encode the plurality of bitplanes based on the error correction code.

4. The system of claim 3, wherein the error correction code is at least one of a low density parity check (LDPC) code or a Turbo code.

5. The system of claim 1, wherein the rate determiner is further configured to identify the rate of the error correction code by estimation of joint statistics of a current frame, a last frame prior to the current frame, and a next frame subsequent to the current frame.

6. The system of claim 1, wherein the rate determiner is further configured to employ motion estimation for the at least one M-frame.

7. The system of claim 6, further comprising a motion estimation optimizer configured to enable the rate determiner to utilize selected Lagrangian multipliers in connection with the motion estimation.

8. The system of claim 7, wherein the motion estimation optimizer is configured to minimize a Lagrangian cost function to determine the selected Lagrangian multipliers.

9. The system of claim 8, wherein the Lagrangian cost function is substantially based on $J_{ME}=D_{DFD}+\lambda R_{ME}$, wherein a prediction distortion $D_{DFD}$ (displaced frame difference) is weighted against a motion vector cost, $R_{ME}$, using a Lagrangian multiplier, $\lambda$.

10. The system of claim 1, further comprising a frame type selector configured to determine a frame type to be utilized for the encoded video frames in a group of pictures.

11. The system of claim 10, wherein the frame type selector is configured to identify a combination of M-frames and P-frames to include in the group of pictures between adjacent I-frames based upon an expected distortion reduction.

12. The system of claim 10, wherein the frame type selector is configured to determine that a first frame in the group of pictures is an I-frame, a next m−1 frames are P-frames, and a remaining n−m frames are M-frames, wherein n is a length of the group of pictures, and m is identified by the frame type selector and is less than or equal to n.

13. A method, comprising:
performing an integer cosine transform on a current frame to generate bands of coefficients;
quantizing the bands of coefficients into a plurality of bitplanes;
determining a rate for use with an error correction code using a two-pass algorithm;
simulating forward decoding and backward decoding as at least part of the two-pass algorithm by performing motion estimation utilizing selected Lagrangian multipliers;
encoding the plurality of bitplanes employing the error correction code with the rate; and
encoding and decoding frames in a current group of pictures in temporal order for a first pass and encoding and decoding frames in the current group of pictures in reverse temporal order for a second pass.

14. The method of claim 13, wherein the determining includes determining the rate for use with at least one of a low density parity check (LDPC) code or a Turbo code.

15. The method of claim 13, wherein the performing the motion estimation comprises minimizing a Lagrangian cost function including weighing predicted distortion against motion vector cost using the selected Lagrangian multipliers.

16. The method of claim 13, further comprising determining the at least one Lagrangian multiplier for forward motion estimation and at least one Lagrangian multiplier for backward motion estimation.

17. The method of claim 16, wherein the at least one Lagrangian multiplier for backward motion estimation is approximately twice the at least one Lagrangian multiplier for forward motion estimation.

18. A computer-readable storage non-transitory medium comprising computer-executable instructions that, in response to execution, cause a computing system to perform operations, comprising:
encoding a first frame in a group of pictures as an I-frame, wherein the group of pictures includes n frames;
encoding a next m−1 frames after the I-frame in the group of pictures as P-frames, wherein m is less than or equal to n;
encoding a remaining n−m frames in the group of pictures as M-frames, wherein the M-frames are P-frames with multiple decoder selectable reference frames at a bidirectional encoder;
identifying a rate of an error correction code using a two-pass algorithm that simulates forward decoding and backward decoding;
encoding and decoding frames in a current group of pictures in temporal order for a first pass; and
encoding and decoding frames in the current group of pictures in reverse temporal order for a second pass.

19. The computer-readable storage non-transitory medium of claim 18, the operations further comprising determining a value of m as a function of at least: distortion reduction of using a P-frame rather than an M-frame in response to a current frame being forward decodable, distortion increase of using a P-frame in response to the P-frame not being forward decodable and the M-frame being backward decodable, and a frame loss rate.

20. The computer-readable storage non-transitory medium of claim 19, wherein the determining the value of in includes determining a value wherein an expected distortion reduction of encoding frame in as a P-frame versus encoding frame in as an M-frame is greater than or equal to zero and wherein m+1 provides an expected distortion reduction of encoding frame m+1 as a P-frame versus encoding frame m+1 as an M-frame less than zero.

* * * * *

UNITED STATES PATENT AND TRADEMARK OFFICE
CERTIFICATE OF CORRECTION

| | | |
|---|---|---|
| PATENT NO. | : 8,218,633 B2 | Page 1 of 1 |
| APPLICATION NO. | : 12/141152 | |
| DATED | : July 10, 2012 | |
| INVENTOR(S) | : Au et al. | |

It is certified that error appears in the above-identified patent and that said Letters Patent is hereby corrected as shown below:

In Column 20, Line 51, in Claim 20, delete "in" and insert -- m --, therefor.

Signed and Sealed this
Twenty-fifth Day of December, 2012

David J. Kappos
*Director of the United States Patent and Trademark Office*